(12) United States Patent
Izumi

(10) Patent No.: US 10,762,597 B2
(45) Date of Patent: Sep. 1, 2020

(54) GENERATION APPARATUS, GENERATION METHOD, REPRODUCTION APPARATUS, AND REPRODUCTION METHOD

(71) Applicant: SONY CORPORATION, Tokyo (JP)

(72) Inventor: Nobuaki Izumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,955

(22) PCT Filed: Apr. 28, 2017

(86) PCT No.: PCT/JP2017/016907
§ 371 (c)(1),
(2) Date: Sep. 20, 2018

(87) PCT Pub. No.: WO2017/195650
PCT Pub. Date: Nov. 16, 2017

(65) Prior Publication Data
US 2019/0108611 A1  Apr. 11, 2019

(30) Foreign Application Priority Data

May 13, 2016  (JP) ................. 2016-097360
Jul. 20, 2016  (JP) ................. 2016-142286

(51) Int. Cl.
*G06T 19/00*  (2011.01)
*G06T 3/00*  (2006.01)
(Continued)

(52) U.S. Cl.
CPC .............. *G06T 3/0062* (2013.01); *G06T 3/00* (2013.01); *G06T 3/4092* (2013.01); *G06T 15/20* (2013.01);
(Continued)

(58) Field of Classification Search
CPC ............ H04N 5/23238; G06F 3/04815; G06F 3/04845
(Continued)

(56) References Cited

U.S. PATENT DOCUMENTS

2006/0034367 A1  2/2006  Park
2014/0307046 A1*  10/2014  Accardo ................ H04N 5/262
                                                                    348/36
2016/0035110 A1*  2/2016  Kiyota ..................... G06T 3/00
                                                                    348/148

FOREIGN PATENT DOCUMENTS

EP      2490179 A1      8/2012
JP      2001-298652 A  10/2001
JP      2016-015705 A   1/2016

OTHER PUBLICATIONS

Oct. 2, 2019, European Search Report issued for related EP Application No. 17796011.9.
(Continued)

*Primary Examiner* — Thomas J Lett
(74) *Attorney, Agent, or Firm* — Paratus Law Group, PLLC

(57) ABSTRACT

There is provided a generation apparatus, a generation method, a reproduction apparatus, and a reproduction method by which a display image generated by use of an omnidirectional image is made approximately uniform in image quality in all visual line directions. A down-conversion part down-converts an omnidirectional image. A perspective projection part generates multiple images by projecting on multiple two-dimensional planes the omnidirectional image mapped onto a 3D model. This disclosure may be applied, for example, to generation apparatuses that generate an omnidirectional image from captured images in six directions so as to generate low- and high-resolution streams of the omnidirectional image.

15 Claims, 24 Drawing Sheets

(51) Int. Cl.
  *H04N 21/2343* (2011.01)
  *H04N 5/74* (2006.01)
  *G06T 3/40* (2006.01)
  *G06T 15/20* (2011.01)
(52) U.S. Cl.
  CPC ............... *G06T 19/00* (2013.01); *H04N 5/74* (2013.01); *H04N 21/2343* (2013.01)
(58) Field of Classification Search
  USPC ........................................................ 345/419
  See application file for complete search history.

(56) References Cited

OTHER PUBLICATIONS

Choi et al., Proposed text for omnidirectional media application format, International Organisation for Standardisation ISO/IEC JTC1/SC29/WG11, Feb. 2016, pp. 1-13, San Diego, CA.

* cited by examiner

FIG. 6

| ID | AZIMUTH ANGLE | ELEVATION ANGLE | ROTATION ANGLE | HORIZONTAL ANGLE OF VIEW | VERTICAL ANGLE OF VIEW | HORIZONTAL PIXEL COUNT | VERTICAL PIXEL COUNT |
|---|---|---|---|---|---|---|---|
| 1 | −90° | 0° | 0° | 90° | 90° | 1024 | 1024 |
| 2 | −45° | 0° | 0° | 90° | 90° | 1024 | 1024 |
| 3 | 0° | 0° | 0° | 90° | 90° | 1024 | 1024 |
| 4 | +45° | 0° | 0° | 90° | 90° | 1024 | 1024 |
| 5 | +90° | 0° | 0° | 90° | 90° | 1024 | 1024 |

FIG. 21

| ID | PROJECTION METHOD | AZIMUTH ANGLE | ELEVATION ANGLE | ROTATION ANGLE | HORIZONTAL ANGLE OF VIEW | VERTICAL ANGLE OF VIEW | HORIZONTAL PIXEL COUNT | VERTICAL PIXEL COUNT |
|---|---|---|---|---|---|---|---|---|
| 1 | TANGENTIAL AXIAL PROJECTION | −90° | 0° | 0° | 90° | 90° | 1024 | 1024 |
| 2 | TANGENTIAL AXIAL PROJECTION | −45° | 0° | 0° | 90° | 90° | 1024 | 1024 |
| 3 | TANGENTIAL AXIAL PROJECTION | 0° | 0° | 0° | 90° | 90° | 1024 | 1024 |
| 4 | TANGENTIAL AXIAL PROJECTION | +45° | 0° | 0° | 90° | 90° | 1024 | 1024 |
| 5 | TANGENTIAL AXIAL PROJECTION | +90° | 0° | 0° | 90° | 90° | 1024 | 1024 |

GENERATION APPARATUS, GENERATION METHOD, REPRODUCTION APPARATUS, AND REPRODUCTION METHOD

CROSS REFERENCE TO PRIOR APPLICATION

This application is a National Stage Patent Application of PCT International Patent Application No. PCT/JP2017/016907 (filed on Apr. 28, 2017) under 35 U.S.C. § 371, which claims priority to Japanese Patent Application Nos. 2016-097360 (filed on May 13, 2016) and 2016-142286 (filed on Jul. 20, 2016), which are all hereby incorporated by reference in their entirety.

TECHNICAL FIELD

The present disclosure relates to a generation apparatus, a generation method, a reproduction apparatus, and a reproduction method. More particularly, the disclosure relates to a generation apparatus, a generation method, a reproduction apparatus, and a reproduction method by which a display image generated by use of an omnidirectional image is made approximately uniform in image quality in all visual line directions.

BACKGROUND ART

One method of reproducing an omnidirectional image involves mapping the image to a 3D model for perspective projection thereby to generate and display a display image in the visual field range in a viewer's visual line direction. The omnidirectional image is obtained by having 360-degree surrounding images in the horizontal direction and 180-degree surrounding images in the vertical direction mapped onto a 3D model.

This method uses only part of the omnidirectional image in generating the display image. For example, in the case where the viewing angle in the horizontal direction is 90 degrees, only a quarter of the entire omnidirectional image is used in the horizontal direction to generate the display image. This applies to the vertical direction in similar way. That region of the omnidirectional image which is used to generate the display image is thus small in proportion with respect to the whole omnidirectional image.

However, because a viewer's visual line direction is designated by the viewer at the time of reproduction, it is difficult for a recording apparatus to record only that portion of the entire omnidirectional image which will be used to generate the display image. For this reason, it has been desired that the amount of omnidirectional image data to be transmitted from the recording apparatus to a reproduction apparatus be reduced by having the entire omnidirectional image recorded on the recording apparatus and by allowing the reproduction apparatus to request the recording apparatus to send only the image region to be used to generate the display image.

Therefore, it has been proposed that the omnidirectional image be divided into multiple regions each of which is turned into an encoded stream so that only the encoded stream of the desired divided region is transmitted from the recording apparatus to the reproduction apparatus (e.g., see PTL 1).

It has also been proposed that an entire omnidirectional image at low resolution be encoded separately from divided and partially overlapping regions of an omnidirectional image at high resolution, and that an encoded stream of the entire low-resolution omnidirectional image and an encoded stream of only that divided region of the high-resolution omnidirectional image which corresponds to the viewer's visual line direction be transmitted from the recording apparatus to the reproduction apparatus (e.g., see PTL 2).

In the preceding case, of the divided regions of the high-resolution omnidirectional image, only the one used to generate the display image needs to be transmitted. This translates into a reduced amount of transmitted data compared with the case where all divided regions of the high-resolution omnidirectional image are transmitted. It is also possible to generate the display image using the low-resolution omnidirectional image in the case where a divided region other than the divided region of the high-resolution omnidirectional image corresponding to the transmitted encoded stream is used to generate the display image or where the viewer's visual line direction is abruptly changed. Further, in a case where the omnidirectional image is divided into numerous regions or in a case where regions spanning the edges of the omnidirectional image are set to be part of the divided regions, it is possible to increase the proportion, with respect to the entire omnidirectional image, of the high-resolution omnidirectional image used to generate the display image.

CITATION LIST

Patent Literature

[PTL 1]
  JP 2001-298652A
[PTL 2]
  JP 2016-15705A

SUMMARY

Technical Problem

However, in the case where the omnidirectional image is generated by equidistant cylindrical projection involving the mapping of 360-degree surrounding images in the horizontal direction and 180-degree surrounding images in the vertical direction onto a sphere, the regions of the omnidirectional image over the sphere are more distorted in shape the closer to the poles (the north and south poles of a globe). For example, the rectangular regions of the omnidirectional image, when mapped near the poles on the sphere, are each distorted into a fan shape.

Thus the divided regions of the same shape and of the same size in the high-resolution omnidirectional image can vary in shape or in size on a perspective projection plane depending on where the divided regions are located in the omnidirectional image. As a result, the divided regions of the high-resolution omnidirectional image can differ in proportion in the display image depending on the visual line direction in effect. It is difficult to generate a display image that is approximately uniform in image quality in all visual line directions.

The present disclosure has been made in view of the above circumstances and is intended to let the display image generated by use of the omnidirectional image be approximately uniform is image quality is all visual line directions.

Solution to Problem

According to a first aspect of the present disclosure, there is provided a generation apparatus including: a down-conversion part configured to down-convert an omnidirectional image; and a projection part configured to generate multiple images by projecting on multiple two-dimensional planes the omnidirectional image mapped onto a 3D model.

A generation method according to the first aspect of the present disclosure corresponds to the generation apparatus according to the first aspect thereof.

Thus according to the first aspect of the present disclosure, an omnidirectional image is down-converted and mapped onto a 3D model. The omnidirectional image is then projected on multiple two-dimensional planes so as to generate multiple images.

According to a second aspect of the present disclosure, there is provided a reproduction apparatus including: an acceptance part configured to accept at least one of multiple images generated by projecting on multiple two-dimensional planes an omnidirectional image mapped onto a 3D model, and the omnidirectional image having been down-converted; and a rendering part configured to generate a display image on the basis of at least either the image accepted by the acceptance part or the down-converted omnidirectional image.

A reproduction method according to the second aspect of the present disclosure corresponds to the reproduction apparatus according to the second aspect thereof.

Thus according to the second aspect of the present disclosure, at least one of multiple images generated by projecting on multiple two-dimensional planes an omnidirectional image mapped onto a 3D model is accepted, along with the omnidirectional image having been down-converted. A display image is then generated on the basis of at least either the image accepted by the acceptance part or the down-converted omnidirectional image.

Incidentally, the generation apparatus according to the first aspect of the present disclosure and the reproduction apparatus according to the second aspect thereof may each be implemented by causing a computer to execute suitable programs.

Also, the programs for causing the computer to implement the generation apparatus according to the first aspect of the present disclosure and the reproduction apparatus according to the second aspect thereof may be transmitted via transmission media or recorded on recording media when offered.

Advantageous Effects of Invention

According to the first aspect of the present disclosure, images are generated. Also according to the first aspect of this disclosure, the display image generated by use of the omnidirectional image is made approximately uniform in image quality in all visual line directions.

According to the second aspect of the present disclosure, images are reproduced. Also according to the second aspect of this disclosure, the display image generated by use of the omnidirectional image is made approximately uniform in image quality in all visual line directions.

It is to be noted that the advantageous effects outlined above are not limitative of the present disclosure. Further advantages will become apparent from a reading of the present disclosure.

BRIEF DESCRIPTION OF DRAWINGS

FIG. 6 is a tabular diagram indicating a typical structure of a two-dimensional plane table for the first embodiment.

FIG. 21 is a tabular diagram indicating a typical structure of a two-dimensional plane table for a second embodiment of the disclosure.

DESCRIPTION OF EMBODIMENTS

Described below are the prerequisites of the present disclosure and the preferred modes for implementing the disclosure (called the embodiments hereunder). It is to be noted that the description will be given under the following headings:
0. Prerequisites of the present disclosure (FIG. 1)
1. First embodiment: delivery system (FIGS. 2 to 14)
2. Second embodiment: delivery system (FIGS. 15 to 21)

Figure 23:
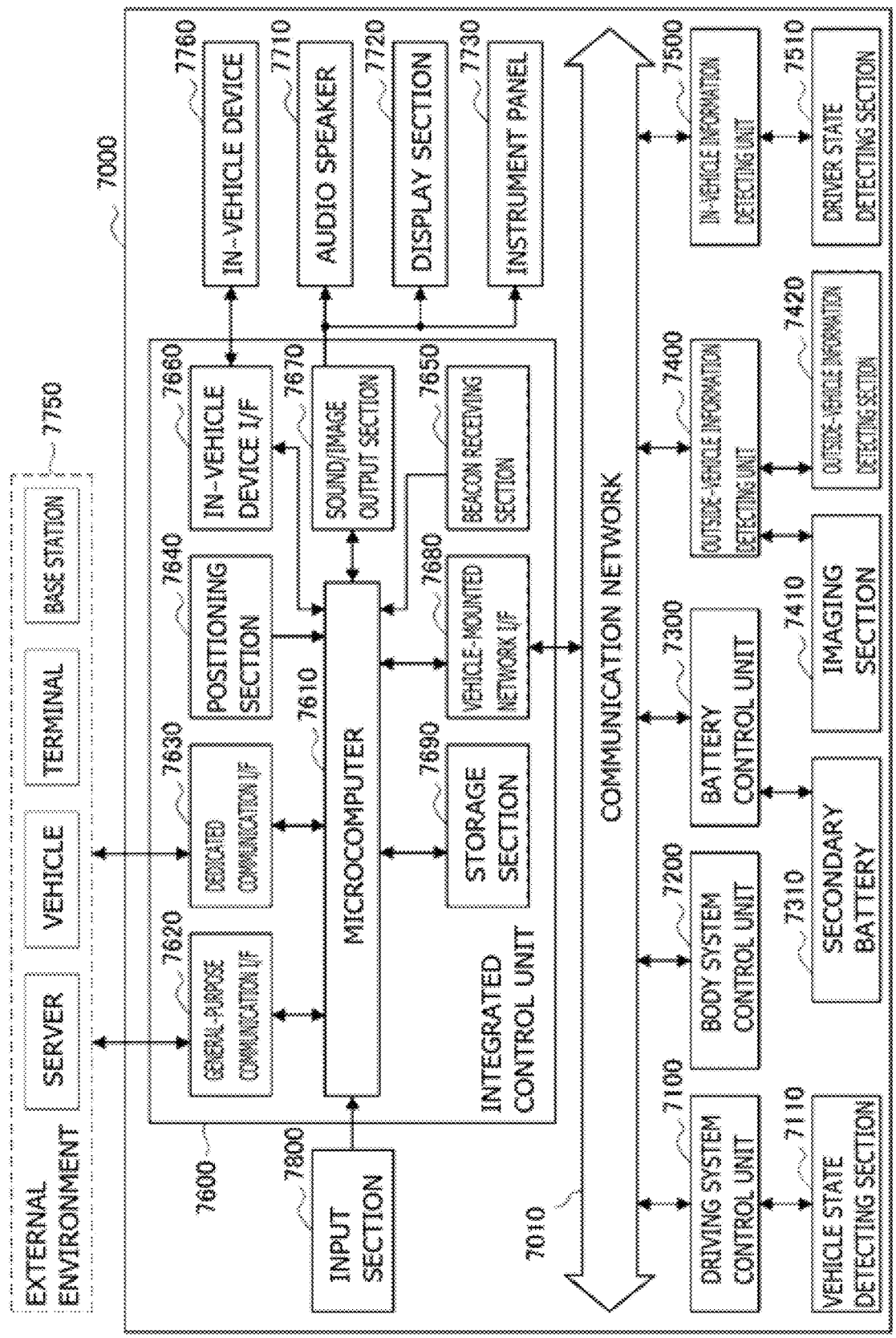
FIG. 23 is a block diagram depicting a typical overall configuration of a vehicle control system.
Figure 24:
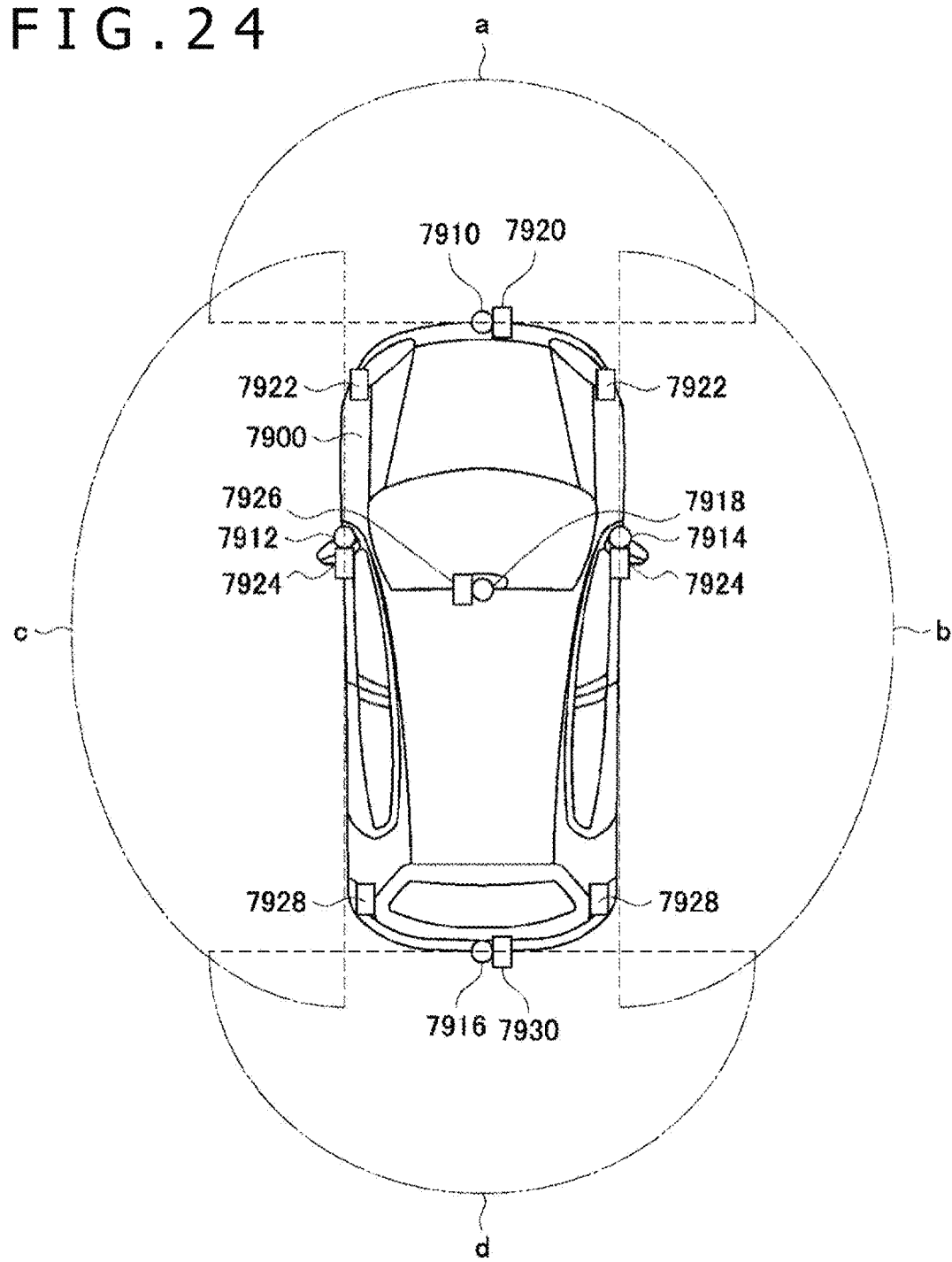
FIG. 24 is an explanatory diagram depicting typical positions where external information detecting parts and imaging parts are installed.

3. Third embodiment: computer (FIG. 22)
4. Application examples (FIGS. 23 and 24)

<Prerequisites of the Present Disclosure>

Figure 1:
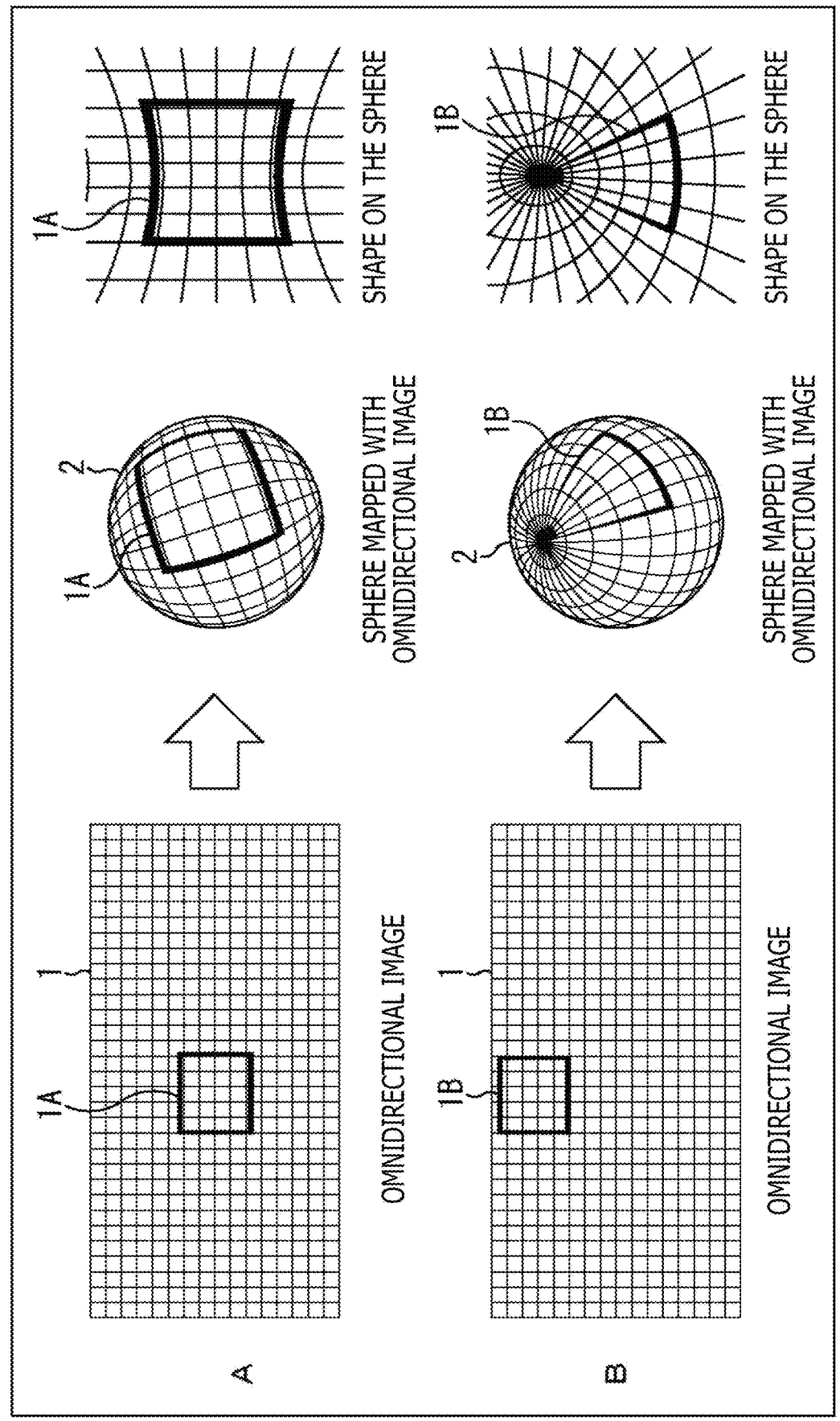
FIG. 1 is an explanatory diagram explaining how an omnidirectional image on a sphere is distorted.

FIG. 1 explains how an omnidirectional image on a sphere is distorted in shape, the distortion taking place in the case where the omnidirectional image is generated by equidistant cylindrical projection of the sphere mapped with 360-degree surrounding images in the horizontal direction and 180-degree surrounding images in the vertical direction.

An omnidirectional image 1 is depicted on the left of Subfigures A and B in FIG. 1. The horizontal and vertical lines in the omnidirectional image 1 denote latitude and longitude lines, respectively. A sphere 2 at the centers of Subfigures A and B in FIG. 1 is a sphere of which the inside is mapped with the omnidirectional image 1. Illustrated on the right of Subfigures A and B in FIG. 1 are portions of the omnidirectional image 1 as viewed from inside the sphere 2 mapped with the omnidirectional image 1.

When a rectangular region 1A near the center of the omnidirectional image 1 as depicted on the left of Subfigure A in FIG. 1 is mapped onto an internal plane of the sphere as indicated in the middle of Subfigure A, the sides of the region 1A perpendicular to the polar direction as viewed from inside the sphere 2 appear distorted and curvilinear in a similar degree as illustrated on the right of Subfigure A in FIG. 1. That is, the region 1A near the center of the omnidirectional image 1 has the mapped position situated by approximately the same distance from both poles in the polar direction. Thus the sides of the region 1A perpendicular to the polar direction as viewed from inside the sphere 2 are distorted to a similar extent.

On the other hand, when a region 1B located near the upper edge of the omnidirectional image 1 and having approximately the same shape and size as the region 1A as depicted on the left of Subfigure B in FIG. 1 is mapped onto the internal plane of the sphere 2 as illustrated in the middle of Subfigure B in FIG. 1, the region 1B as viewed from inside the sphere 2 appears fan-shaped as indicated on the right of Subfigure B in FIG. 1. That is, the region 1B near the upper edge of the omnidirectional image 1 has the mapped position situated near the upper pole and far away from the bottom pole as illustrated. Thus the sides of the region 1B perpendicular to the polar direction as viewed from inside the sphere 2 are distorted and curvilinear, the amount of the distortion being greater the closer to the pole than away from it.

As described above, in the case where the omnidirectional image is generated by equidistant cylindrical projection of the sphere mapped with 360-degree surrounding images is the horizontal direction and 180-degree surrounding images in the vertical direction, the regions of the same shape and the same size in the omnidirectional image 1 appear different in shape and in size depending on their positions in the omnidirectional image 1. That means the images generated on two-dimensional planes by perspective projection of the sphere 2 mapped with the omnidirectional image 1 also vary in shape and in size.

First Embodiment

Typical Configuration of the Delivery System as the First Embodiment

Figure 2:
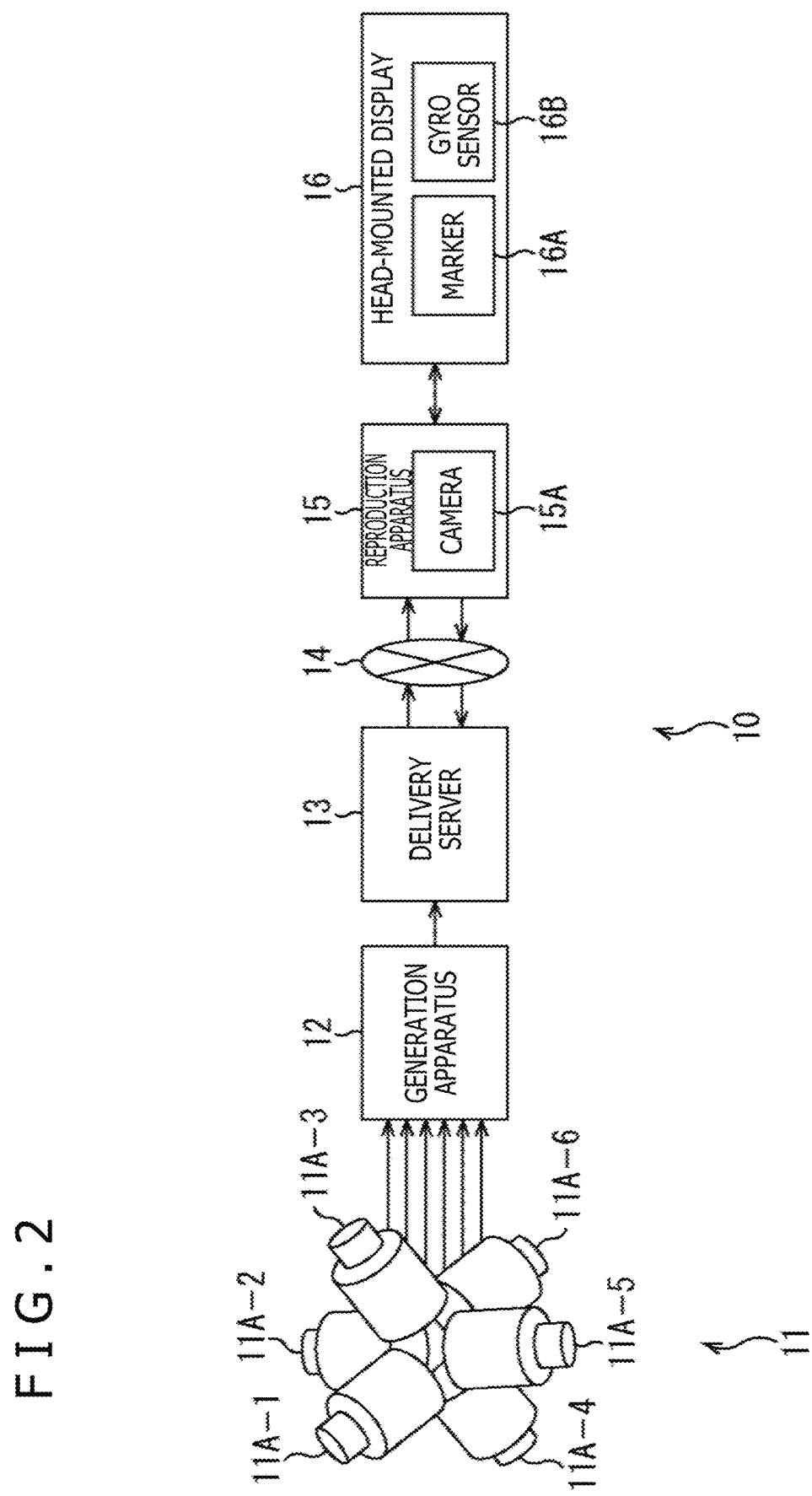
FIG. 2 is a block diagram depicting a typical configuration of a delivery system as a first embodiment to which the present disclosure is applied.

FIG. 2 is a block diagram depicting a typical configuration of a delivery system as a first embodiment to which the present disclosure is applied.

A delivery system 10 in FIG. 2 is configured with an imaging apparatus 11, a generation apparatus 12, a delivery server 13, a network 14, a reproduction apparatus 15, and a head-mounted display 16. The delivery system 10 generates an omnidirectional image from images captured by the imaging apparatus 11 and, using the omnidirectional image, displays a display image in a viewer's visual field range.

Specifically, the imaging apparatus 11 of the delivery system 10 includes six cameras 11A-1 to 11A-6. In the description that follows, the cameras 11A-1 to 11A-6 will be generically referred to as the cameras 11A where there is no specific need to distinguish one camera from another.

Each camera 11A captures a moving image. The imaging apparatus 11 supplies the generation apparatus 12 with moving images captured in six directions by the cameras 11A. Incidentally, the number of cameras included in the imaging apparatus 11 need only be at least two and is not limited to six.

Using a method based on equidistant cylindrical projection, the generation apparatus 12 generates an omnidirectional image from the captured images supplied form the imaging apparatus 11 and down-converts the omnidirectional image. The generation apparatus 12 encodes the down-converted omnidirectional image, which is a low-resolution image (YUV image), to generate a single low-resolution stream.

Also, the generation apparatus 12 maps the omnidirectional image onto a sphere serving as a 3D model. The generation apparatus 12 allows the omnidirectional image mapped onto the sphere to be projected by perspective projection on two-directional planes corresponding to five visual line directions using the center of the sphere as the focal point, thereby generating five images. The generation apparatus 12 encodes each of the five images as a high-resolution image (YUV image) to generate five high-resolution streams.

Further, the generation apparatus 12 generates two-dimensional plane information indicative of the positions, inclinations, and sizes of the two-dimensional planes corresponding to the high-resolution images. The generation apparatus 12 uploads one low-resolution stream, five high-resolution streams, and the two-dimensional plane information to the delivery server 13.

The delivery server 13 is connected with the reproduction apparatus 15 via the network 14. The delivery server 13 stores one low-resolution stream, five high-resolution steams, and the two-dimensional plane information uploaded from the generation apparatus 12. In response to requests from the reproduction apparatus 15, the delivery server 13 transmits the stored low-resolution stream, high-resolution streams, and two-dimensional plane information to the reproduction apparatus 15 via the network 14.

The reproduction apparatus 15 requests one low-resolution stream and the two-dimensional plane information to the delivery server 13 via the network 14. The reproduction apparatus 15 then receives one low-resolution stream and the two-dimensional plane information transmitted from the delivery server 13 in response to the request.

Also, the reproduction apparatus 15 uses an internal camera 15A to capture an image of a marker 16A attached to the head-mounted display 16. On the basis of the captured image of the marker 16A, the reproduction apparatus 15 detects the viewer's viewing position in the coordinate system of the 3D model. Further, the reproduction apparatus 15 receives from the head-mounted display 16 detection results of a gyro sensor 16B located therein. Given the detection results of the gyro sensor 16B, the reproduction apparatus 15 determines accordingly the viewer's visual line direction in the 3D model coordinate system. On the basis of the viewing position and the visual line direction, the reproduction apparatus 15 determines the viewer's visual field range inside the 3D model.

Then on the basis of the two-dimensional plane information and the viewer's visual field range, the reproduction apparatus 15 requests one of the five high-resolution streams via the network 14. The reproduction apparatus 15 receives the single high-resolution stream transmitted in response to the request.

The reproduction apparatus 15 decodes one low-resolution stream and one high-resolution stream having been received. The reproduction apparatus 15 maps a low-resolution image obtained by decoding onto the sphere as a 3D model. The reproduction apparatus 15 proceeds to map a high-resolution image acquired by decoding onto a two-dimensional plane as a 3D model inside the sphere. In this manner, the reproduction apparatus 15 generates a 3D model image.

The reproduction apparatus 15 then projects the 3D model image through perspective projection to the viewer's visual field range using the viewing position as the focal point, thereby generating an image of the viewer's visual field range as the display image. The reproduction apparatus 15 supplies the display image to the head-mounted display 16.

The head-mounted display 16, worn by the user on the head, displays the display image supplied from the reproduction apparatus 15. The head-mounted display 16 is furnished with the marker 16A whose image is captured by the camera 15A. Thus wearing the head-mounted display 16 on the head, the viewer can designate the viewing position by moving about. The gyro sensor 16B incorporated in the head-mounted display 16 detects angular velocity and transmits the detection results to the reproduction apparatus 15. This allows the viewer wearing the head-mounted display 16 on the head to designate the visual line direction by rotating the head position.

In the delivery system 10, the method of delivery from the delivery server 13 to the reproduction apparatus 15 may be any suitable method. For example, in the case where moving picture experts group phase-dynamic adaptive streaming over HTTP (MPEG-DASH) is used as the delivery method, the delivery server 13 is a hypertext transfer protocol (HTTP) server and the reproduction apparatus 15 is an MPEG-DASH client.

(Typical Configuration of the Reproduction Apparatus)

Figure 3:
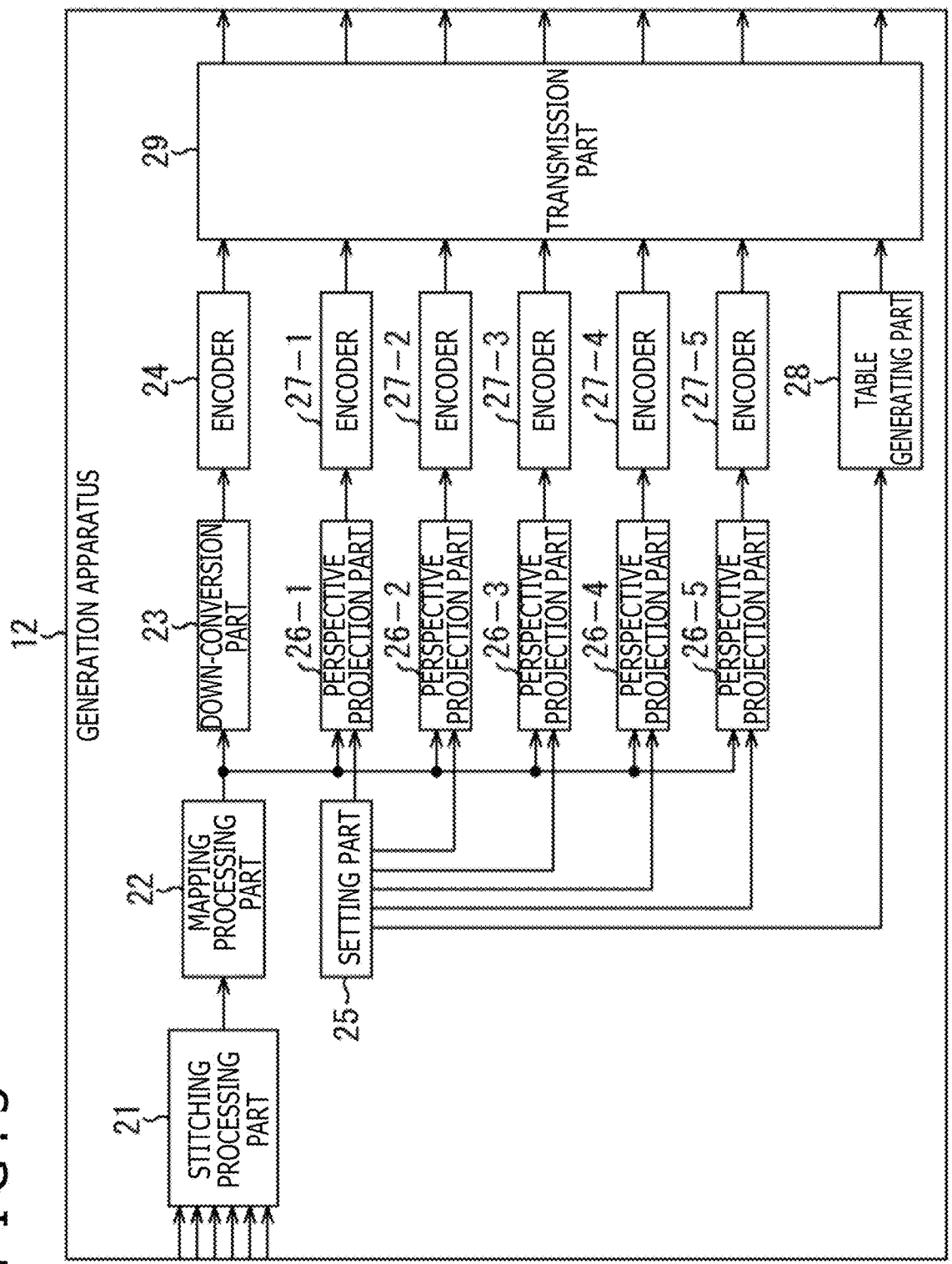
FIG. 3 is a block diagram depicting a typical configuration of a generation apparatus indicated in FIG. 2.

FIG. 3 is a block diagram depicting a typical configuration of the generation apparatus 12 indicated in FIG. 2.

The generation apparatus 12 in FIG. 3 is configured with a stitching processing part 21, a mapping processing part 22, a down-conversion part 23, an encoder 24, a setting part 25, perspective projection parts 26-1 to 26-5, encoders 27-1 to 27-5, a table generating part 28, and a transmission part 29.

The stitching processing part 21 stitches, frame by frame, captured images in six directions supplied from the cameras 11A, in FIG. 2, in such a manner that the stitched images are unified in color and brightness with no overlaps therebetween. The stitching processing part 21 supplies the mapping processing part 22 with the resulting captured images in units of a frame.

Using a method based on equidistant cylindrical projection, the mapping processing part 22 generates an omnidirectional image from the captured images supplied form the stitching processing part 21. Specifically, the mapping processing part 22 maps the captured images as textures onto a sphere centering on a predetermined viewpoint, and generates an omnidirectional image by equidistant cylindrical projection of the sphere. Thus the omnidirectional image generated by the mapping processing part 22 is shaped as a rectangle suitable for encoding.

The mapping processing part 22 supplies the omnidirectional image to the down-conversion part 23 and to the perspective projection parts 26-1 to 26-5. Preferably, the stitching processing part 21 and the mapping processing part 22 may be integrated into a single part.

The down-conversion part 23 down-converts the omnidirectional image supplied from the mapping processing part 22 to generate a low-resolution image. The down-conversion part 23 supplies the generated low-resolution image to the encoder 24.

The encoder 24 (low-resolution encoding part) encodes the low-resolution image supplied from the down-conversion part 23 using an encoding method such as the moving picture experts group phase 2 (MPEG2) method or the advanced video coding (AVC) method, thereby generating a single low-resolution stream. The encoder 24 supplies the low-resolution stream to the transmission part 29.

The setting part 25 sets two-dimensional plane information corresponding to five visual line directions. The setting part 25 supplies the corresponding portions of the two-dimensional plane information to the perspective projection parts 26-1 to 26-5. Also, the setting part 25 supplies the five portions of the two-dimensional plane information to the table generating part 28.

Each of the perspective projection parts 26-1 to 26-5 maps the omnidirectional image supplied from the mapping processing part 22 onto the sphere. Each of the perspective projection parts 26-1 to 26-5 generates an image by perspective projection, using the center of the sphere as the focal point, of the omnidirectional image mapped onto the sphere to the two-dimensional planes indicated by the two-dimensional plane information supplied from the setting part 25. Each of the images thus generated is an image obtained by viewing, from the center of the sphere in a predetermined visual line direction, the omnidirectional image mapped onto the sphere. The perspective projection parts 26-1 to 26-5 supply the images they have generated as high-resolution images to the encoders 27-1 to 27-5, respectively.

The encoders 27-1 to 27-5 (high-resolution encoding parts) encode the high-resolution images supplied respectively from the perspective projection parts 26-1 to 26-5, using an encoding method such as MPEG2 or AVC so as to generate one high-resolution stream.

At this time, across the five high-resolution streams generated by the encoders 27-1 to 27-5, for example, sync points such as the first picture of each group of pictures (GOP) and IDR pictures are made the same. Each of the encoders 27-1 to 27-5 generates one high-resolution stream and supplies it to the transmission part 29.

In the description that follows, the perspective projection parts 26-1 to 26-5 will be generically referred to as the perspective projection parts 26 where there is no particular need to distinguish one perspective projection part from another. Likewise, the encoders 27-1 to 27-5 will be generally referred to as the encoders 27.

The table generating part 28 generates a two-dimension plane table that includes five portions of the two-dimensional plane information supplied from the setting part 25. The table generating part 2 supplies the generated table to the transmission part 29.

The transmission part 29 uploads (transmits) one low-resolution stream supplied from the encoder 24, a total of five high-resolution streams from the encoders 7, and the two-dimensional plane table from the table generating part 28 to the delivery server 13 in FIG. 2.

First Example of Two-Dimensional Planes

Figure 4:
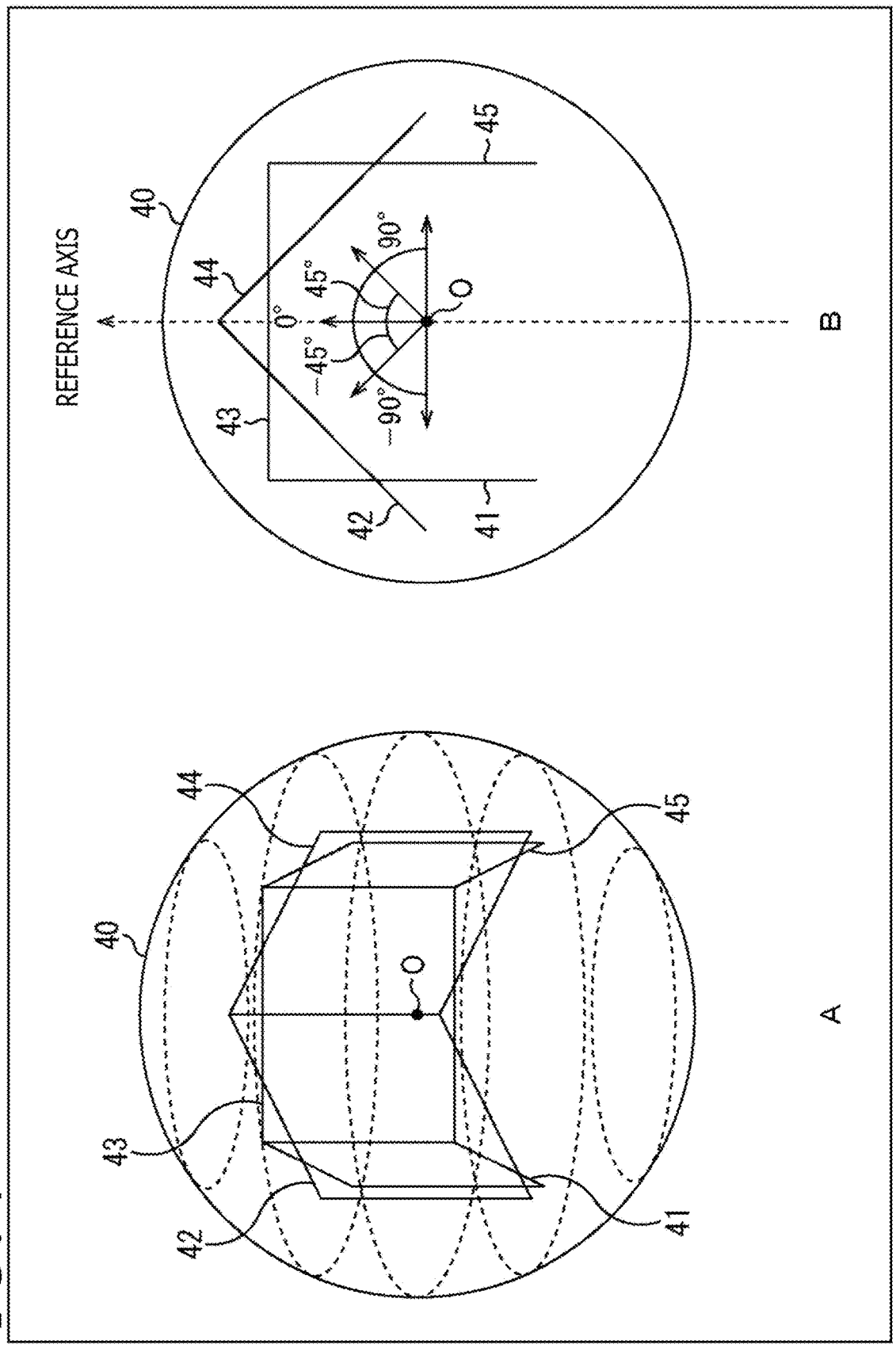
FIG. 4 is a schematic diagram depicting a first example of two-dimensional planes.

FIG. 4 is a schematic diagram depicting a first example of five two-dimensional planes set by the setting part 25 in FIG. 3.

Subfigures A and B in FIG. 4 are a perspective view and a top view, respectively, of a sphere as a 3D model inside which two-dimensional planes are set, the top view being indicative of a horizontal cross-section of the sphere.

The example in FIG. 4 indicates an omnidirectional image generated from images captured of a concert venue. When the omnidirectional image is mapped onto a sphere 40, there occurs an omnidirectional image of the stage at the concert venue in such a manner as to form angles of −90, −45, 0, 45, and 90 degrees in the horizontal direction relative to a horizontal-plane reference axis that passes through the center O of the sphere 40. That is, the visual line directions presumed to be important by the viewer whose viewing position is at the center O form the angles of −90, −45, 0, 45, and 90 degrees in the horizontal direction relative to the reference axis.

Thus as depicted in Subfigures A and B in FIG. 4, the setting part 25 sets two-dimensional planes 41 to 45 inside the sphere 40 in such a manner that lines passing through the center O of the sphere 40 at the angles of −90, −45, 0, 45, and 90 degrees in the horizontal direction relative to the reference axis are normal lines passing through the centers of the two-dimensional planes, and that adjacent two of the planes intersect with each other. Therefore, the omnidirectional image generated by perspective projection on the two-dimensional planes 41 to 45 forms partial overlaps between two adjacent planes.

Also in the example of FIG. 4, the absolute values of the angles in the horizontal direction between the reference axis and the normal lines passing through the centers of the two-dimensional planes 41 to 45 are 90 degrees or less. Thus the reproduction apparatus 15, even by using the high-resolution images corresponding to all two-dimensional planes, cannot generate the display image corresponding to all visual line directions in a 360-degree circumference in the horizontal direction and in a 180-degree circumference in the vertical direction.

Incidentally, in the example of FIG. 4, the normal lines passing through the centers of the two-dimensional planes 41 to 45 all form 0 degrees relative to the reference axis in the vertical direction. The two-dimensional planes 41 to 45 thus have no inclination.

(Explanation of High-Resolution Images)

Figure 5:
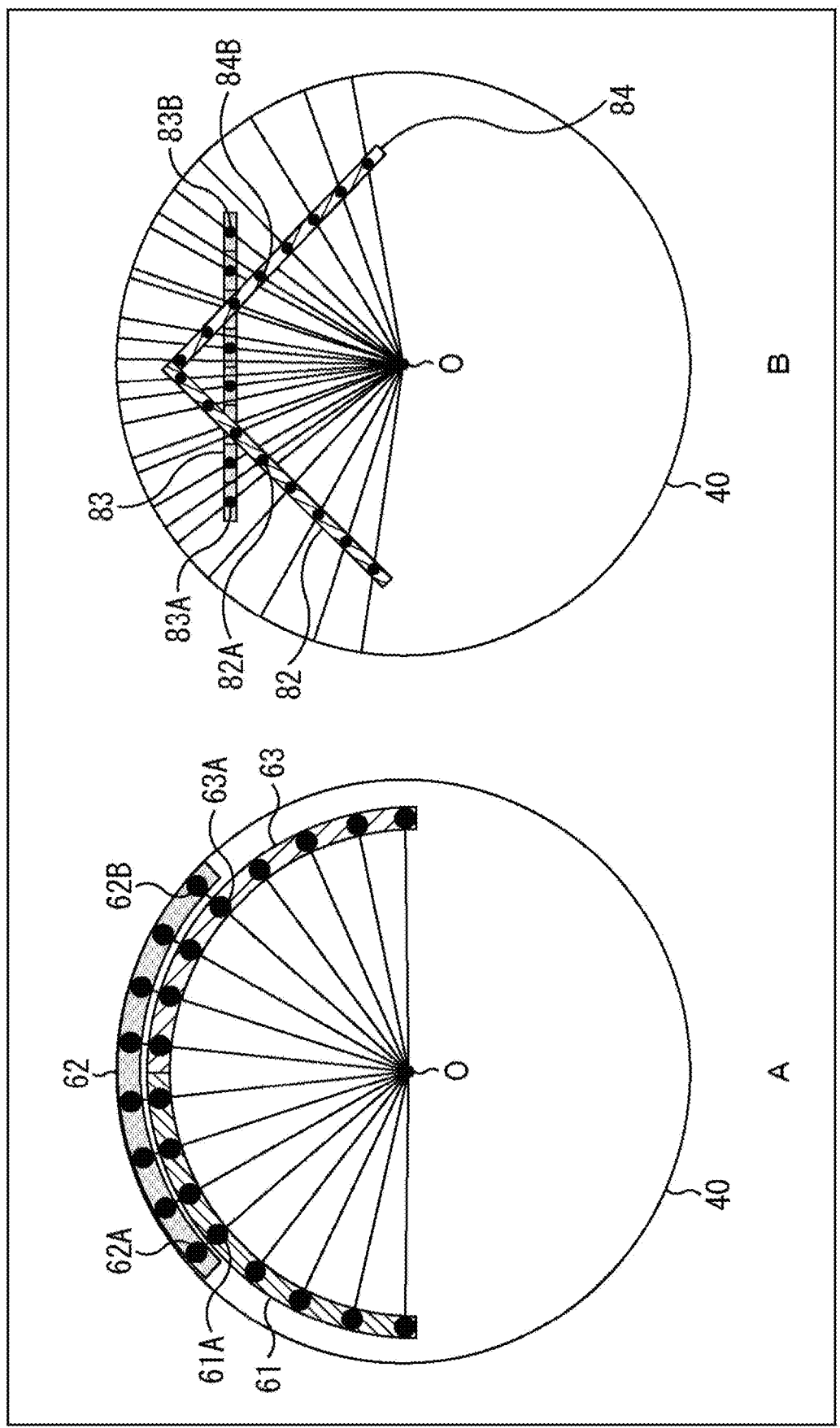
FIG. 5 is an explanatory diagram explaining high-resolution images.

FIG. 5 is an explanatory diagram explaining high-resolution images generated by the perspective projection parts 26 in FIG. 3.

In the example of FIG. 5, the setting part 25 sets two-dimensional plane information regarding the two-dimensional planes 41 to 45 in FIG. 4. Subfigures A and B in FIG. 5 are top views of the sphere 40 mapped with and omnidirectional image. Small black circles in FIG. 5 represent pixels.

As depicted in Subfigure A in FIG. 5, the omnidirectional image may be divided into regions with partial overlaps therebetween to generate high-resolution images. In this case, the pixels (sampling points) of the regions overlapping with each other in the adjacent high-resolution images have the same positions when mapped onto the sphere 40.

Specifically, pixels 61A and 62A in overlapping regions of high-resolution images 61 and 62 as adjacent divided regions have the same position when mapped onto the sphere 40. Likewise, pixels 62B and 63A in overlapping regions of the high-resolution images 62 and 63 as adjacent divided regions have the same position when mapped onto the sphere 40. That is, the pixels 61A and 62A have the same position on the omnidirectional image, and the pixels 62B and 63A also have the same position on the omnidirectional image.

Thus the pixels in the overlapping regions of the high-resolution images 61 to 63 may be overlaid with each other and pasted to each other to form a portion of the omnidirectional image. It is to be noted that in Subfigure A in FIG. 5, the high-resolution images 61 and 63 are detached from the sphere 40 to facilitate visualization.

On the other hand, as depicted in Subfigure B in FIG. 5, the pixels in high-resolution images 82 to 84 projected by the perspective projection parts 26 through perspective projection on two-dimensional planes 42 to 44 have different positions when mapped to the sphere 40.

Specifically, a pixel 82A located in the high-resolution image 82 and mapped onto the sphere 40 is different in position from a pixel 83A located in the high-resolution image 83 and mapped closest to the pixel 82A. Likewise, a pixel 83B located in the high-resolution image 83 and mapped onto the sphere 40 is different in position from a pixel 84B located in the high-resolution image 84 and mapped closest to the pixel 83B. Thus having the high-resolution images 82 to 84 overlaid with each other and pasted to each other fails to generate a portion of the omnidirectional image.

Incidentally, although Subfigure B in FIG. 5 depicts only the high-resolution images 82 to 84 projected through perspective projection on the two-dimensional planes 42 to 44, this also applies to the high-resolution images projected through perspective projection on the two-dimensional planes 41 and 45 in similar way.

(Typical Structure of the Two-Dimensional Plane Table)

FIG. 6 is a tabular diagram indicating a typical structure of a two-dimensional plane table generated by the table generating part 28 in FIG. 3.

In the example of FIG. 6, the two-dimensional plane information includes azimuth angles and elevation angles as information indicative of the positions of the two-dimensional planes 41 to 45 in FIG. 5, rotation angles as information indicative of the inclinations of the two-dimensional planes, and horizontal and vertical angles of view as information indicative of the sizes of the two-dimensional planes.

Incidentally, the azimuth angle and elevation angle are the horizontal- and vertical-direction angles, respectively, between each of the lines connecting the center O of the sphere 40 with the centers of the two-dimensional planes 41 to 45 on the one hand, and a horizontal-plane reference axis passing through the center O on the other hand. The rotation angle is the angle formed by each of the two-dimensional planes 41 to 45 rotating around an axis connecting the center of each of the two-dimensional planes 41 to 45 with the center O. The horizontal angle of view is the angle between two lines that connect two horizontal-direction edges of each of the two-dimensional planes 41 to 45 with the edges with the center O. The vertical angle of view is the angle between two lines that connect two vertical-direction edges of each of the two-dimensional planes 41 to 45 with the center O.

In this case, as illustrated in FIG. 6, the two-dimensional plane table has a unique ID registered therein for each of the two-dimensional planes 41 to 45. In the example of FIG. 6, the two-dimensional planes 41 to 45 are assigned IDs ranging from 1 to 5 respectively. The numbers 1 to 5 are registered as the IDs in the two-dimensional plane table.

Also, the two-dimensional plane table has the IDs associated with two-dimensional plane information registered regarding the corresponding two-dimensional planes, with horizontal pixel counts each registered to represent the number of pixels in the horizontal direction of the high-resolution image on each two-dimensional plane, and with vertical pixel counts each registered to indicate the number of pixels in the vertical direction of the high-resolution image on each two-dimensional plane.

Specifically, the two-dimensional planes 41 to 45 are set in such a manner that they have normal lines passing through their centers and the center O of the sphere 40, the normal lines forming the angles of −90, −45, 0, 45, and 90 degrees relative to the reference axis in the horizontal direction, the normal lines all forming the angle of 0 degrees relative to the reference axis in the vertical direction; and that the two-dimensional planes have no inclination. Thus the IDs "1" to "5" are associated respectively with the azimuth angles of "−90 degrees," "−45 degrees," "0 degrees," "45 degrees," and "90 degrees" that are registered. Further, the IDs "1" to "5" are associated with the elevation angle of "0 degrees" and the rotation angle of "0 degrees" that are registered.

Also in the example of FIG. 6, the horizontal and vertical angles of view of the two-dimensional planes 41 to 45 are 90 degrees each, and the horizontal and vertical pixel counts of the two-dimensional planes are 1024 each. Thus the IDs "1" to "5" are associated with the horizon angle of view of "90 degrees," the vertical angle of view of "90 degrees," the horizontal pixel count of "1024," and the vertical pixel count of "1024" that are registered.

(Explanation of the Process Performed by the Generation Apparatus)

Figure 7:
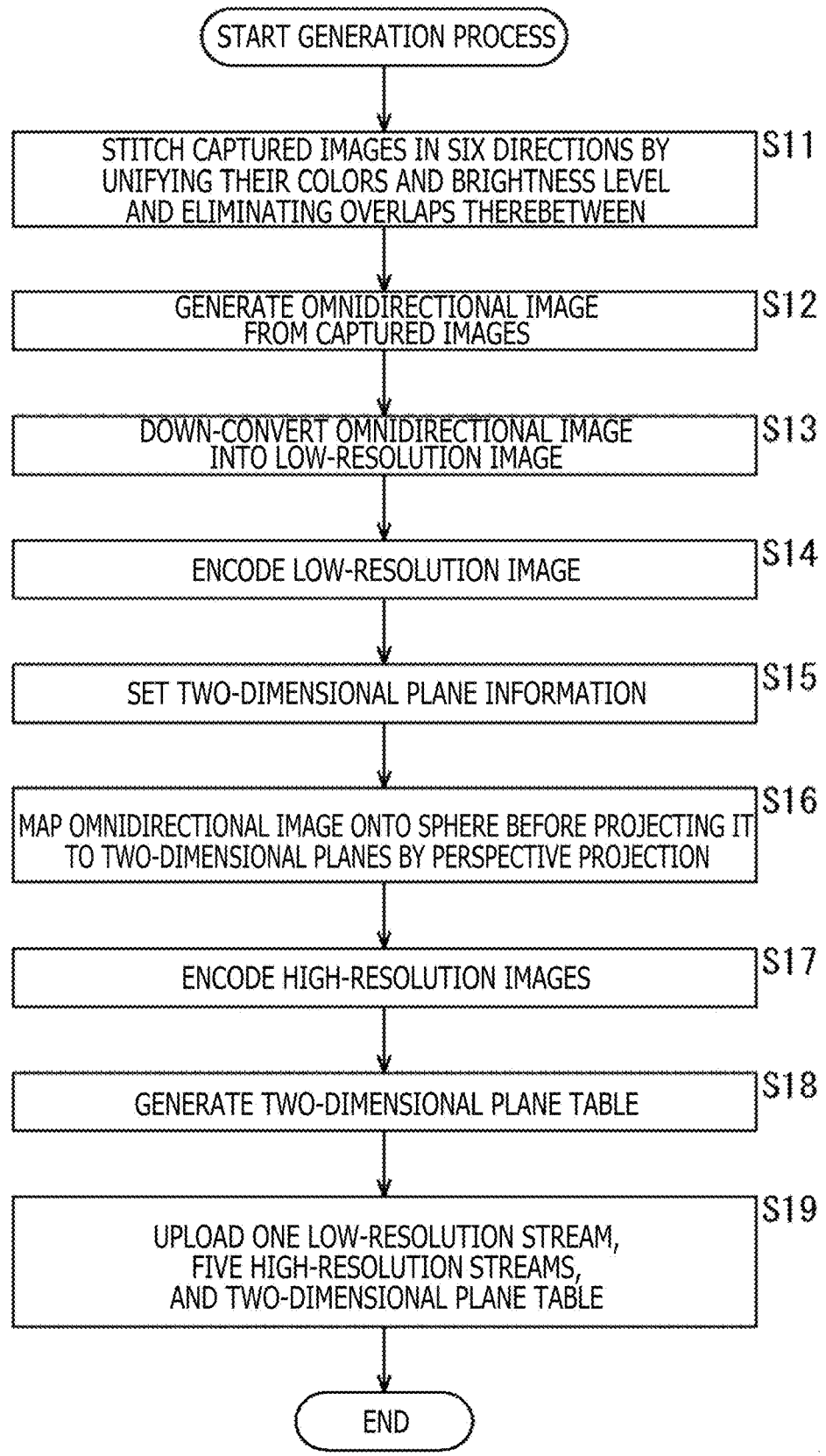
FIG. 7 is a flowchart explaining a generation process performed by the generation apparatus indicated in FIG. 3.

FIG. 7 is a flowchart explaining the generation process performed by the generation apparatus 12 indicated in FIG. 3.

In step S11 of FIG. 7, the stitching processing part 21 stitches, frame by frame, captured images in six directions from the cameras 11A in FIG. 2 in a manner unifying the colors and brightness levels of the images and eliminating overlaps therebetween. The stitching processing part 21 supplies the mapping processing part 22 with the stitched captured images in units of a frame.

In step S12, the mapping processing part 22 generates an omnidirectional image from the captured images supplied from the stitching processing part 21 using a method based on equidistant cylindrical projection. The mapping processing part 22 supplies the omnidirectional image to the down-conversion part 23 and to the perspective projection parts 26-1 to 26-5.

In step S13, the down-conversion part 23 generates a low-resolution image by down-converting the omnidirectional image supplied from the mapping processing part 22. The down-conversion part 23 supplies the generated low-resolution image to the encoder 24.

In step S14, the encoder 24 encodes the low-resolution image supplied from the down-conversion part 23 to generate a single low-resolution stream. The encoder 24 supplies the low-resolution stream to the transmission part 29.

In step S15, the setting part 25 sets two-dimensional plane information corresponding to five visual line directions. The setting part 25 supplies the respective two-dimensional plane information to the perspective projection parts 26 and supplies five portions of the two-dimensional plane information to the table generating part 28.

In step S16, the perspective projection parts 26 map the omnidirectional image supplied from the mapping processing part 22 onto a sphere and, using the center of the sphere as the focal point, project the omnidirectional image mapped onto the sphere on the two-dimensional planes designated by the two-dimensional plane information supplied from the setting part 25, thereby generating images. The perspective projection parts 26 supply the generated images as high-resolution images to the encoders 27.

In step S17, the encoders 27 encode the high-resolution images supplied from the perspective projection parts 26 to generate a single high-resolution stream. The encoders 27 supply the high-resolution stream to the transmission part 29.

In step S18, the table generating part 28 generates a two-dimensional plane table that includes five portions of the two-dimensional plane information supplied from the setting part 25. The table generating part 28 supplies the two-dimensional plane table to the transmission part 29.

In step S19, the transmission part 29 uploads the single low-resolution stream supplied from the encoder 24, a total of five high-resolution streams from the encoders 27, and the two-dimensional plane table from the table generating part 28 to the delivery server 13.

(Typical Configurations of the Delivery Server and Reproduction Apparatus)

Figure 8:
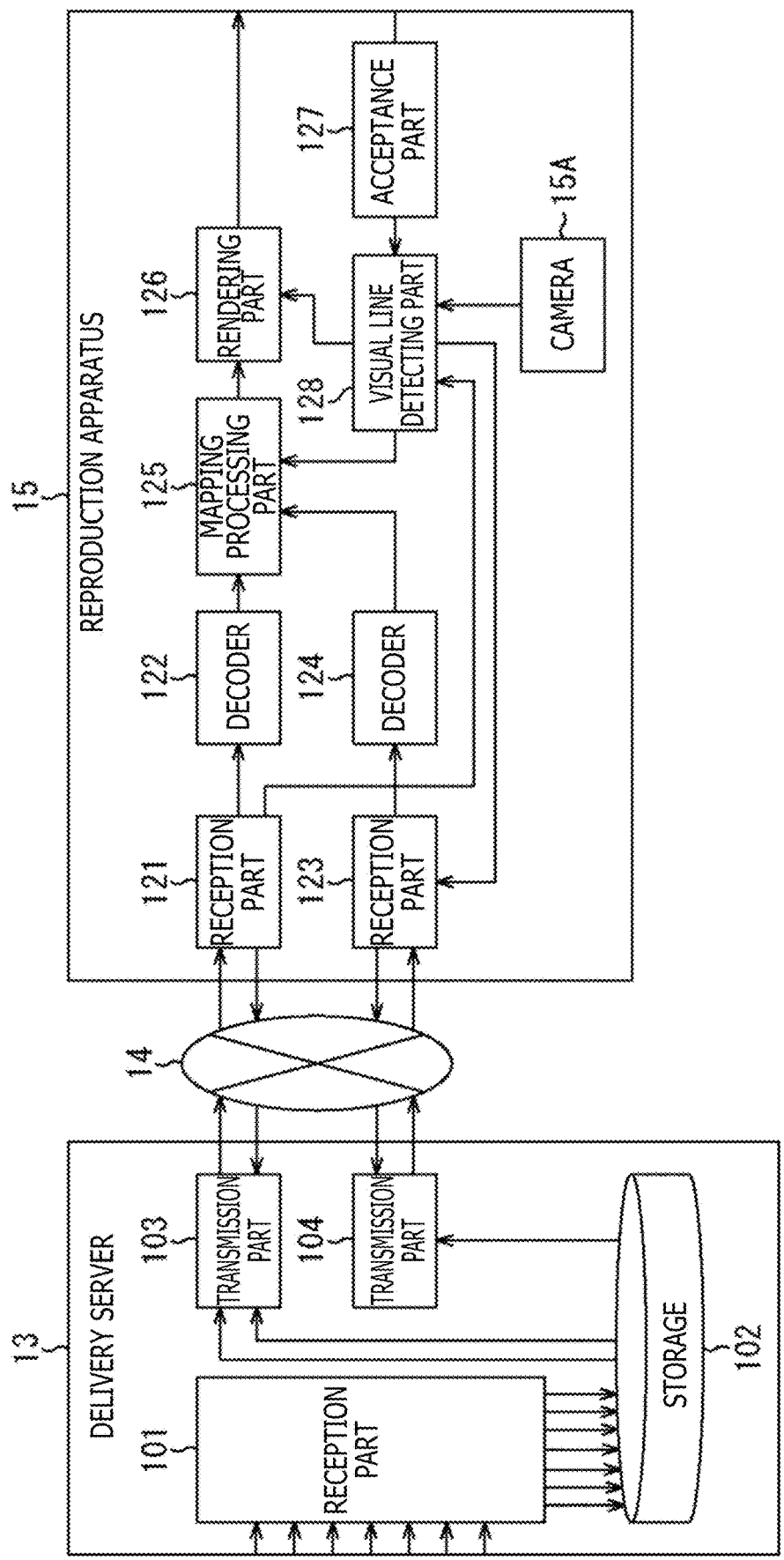
FIG. 8 is a block diagram depicting typical configurations of a delivery server and a reproduction apparatus indicated in FIG. 2.

FIG. 8 is a block diagram depicting typical configurations of the delivery server 13 and the reproduction apparatus 15 indicated in FIG. 2.

As depicted in FIG. 8, the delivery server 13 is configured with a reception part 101, storage 102, a transmission part 103, and a transmission part 104.

The reception part 101 supplies the storage 102 with one low-resolution stream, five high-resolution streams, and the two-dimensional plane table uploaded from the generation apparatus 12 in FIG. 2.

The storage 102 stores the single low-resolution stream, five high-resolution streams, and two-dimensional plane table supplied from the reception part 101.

In response to requests from the reproduction apparatus 15, the transmission part 103 reads one low-resolution stream and the two-dimensional plane table from the storage 102 and transmits the retrieved stream and table to the reproduction apparatus 15 via the network 14.

In response to requests from the reproduction apparatus 15, the transmission part 104 reads one high-resolution stream from the storage 102 and transmits the retrieved stream to the reproduction apparatus 15 via the network 14. Incidentally, the high-resolution stream to be transmitted is changed using sync points. Thus the high-resolution stream targeted for transmission is changed in units of several to tens of frames.

As described above, the sync points are the same across the five high-resolution streams. When the transmission part 104 changes at sync points the high-resolution stream to be transmitted, the reproduction apparatus 15 can easily change the high-resolution image to be reproduced.

The reproduction apparatus 15 is configured with the camera 15A, a reception part 121, a decoder 122, a reception part 123, a decoder 124, a mapping processing part 125, a rendering part 126, an acceptance part 127, and a visual line detecting part 128.

The reception part 121 of the reproduction apparatus 15 requests one low-resolution stream and two-dimensional plane information to the delivery server 13 via the network 14. The reception part 121 (acceptance part) receives the single low-resolution stream and the two-dimensional plane information transmitted from the transmission part 103 in response to the request. The reception part 121 supplies the single low-resolution stream to the decoder 122 and the two-dimensional plane information to the visual line detecting part 128.

The decoder 122 (low-resolution decoding part) decodes the low-resolution stream supplied from the reception part 121 to generate a low-resolution image. The decoder 122 supplies the low-resolution image to the mapping processing part 125.

The reception part 123 acquires from the visual line detecting part 128 selected-plane information indicative of the ID of one two-dimensional plane selected from among the five two-dimensional planes. On the basis of the selected-plane information, the reception part 123 requests via the network 14 one of the five high-resolution streams which represents the selected plane identified by the selected-plane information. The reception part 123 receives the single high-resolution stream transmitted from the transmission part 104 in response to the request, and supplies the received stream to the decoder 124.

The decoder 124 (high-resolution decoding part) decodes the single high-resolution stream supplied from the reception part 123 to generate a high-resolution image. The decoder 124 supplies the high-resolution image to the mapping processing part 125.

On the basis of the two-dimensional plane information regarding the selected plane supplied from the visual line detecting part 128, the mapping processing part 125 sets the selected plane as a 3D model inside a sphere set beforehand as a 3D model. The mapping processing part 125 maps the low-resolution image supplied from the decoder 122 as a texture onto the sphere as the 3D model. Also, the mapping processing part 125 maps the high-resolution image supplied from the decoder 124 as a texture onto the two-dimensional plane as the 3D model. The mapping processing part 125 supplies the rendering part 126 with a 3D model image having the textures mapped onto the sphere and the selected plane.

The rendering part 126 performs perspective projection of the 3D model image supplied from the mapping processing part 125 on the viewer's visual field range using the viewing position supplied from the visual line detecting part 128 as the focal point so as to generate a display image representing the viewer's visual field range. That is, the rendering part 126 generates as the display image the image mapped onto the sphere 40 or the two-dimensional plane viewed from the viewing position through the visual field range. The rendering part 126 supplies the display image to the head-mounted display 16.

The acceptance part 127 accepts detection results of the gyro sensor 16B in FIG. 2 from the head-mounted display 16, and supplies the detection results to the visual detecting part 128.

The visual line detecting part 128 determines the viewer's visual line direction in the coordinate system of the 3D model on the basis of the detection results of the gyro sensor 16B supplied from the acceptance part 127. Also, the visual line detecting part 128 acquires a captured image of the marker 16A from the camera 15A and, based on the captured image, detects the viewing position in the 3D model coordinate system.

The visual line detecting part 128 (selection part) determines as the selected plane one of the five two-dimensional planes which corresponds to the normal line closest to the viewer's visual line on the basis of the viewing position and the visual line in the 3D model coordinate system as well as the two-dimensional plane information supplied from the reception part 121.

Specifically, the visual line detecting part 128 acquires, as the selected-plane ID, the ID of the two-dimensional plane corresponding to the azimuth angle, elevation angle, and rotation angle that are closest to the horizontal- and vertical-direction angles between the visual line extending from the viewing position in the visual line direction on the one hand and the reference axis on the other hand and also closest to the rotation angle of the visual line.

This allows the visual line detecting part 128 to determine as the selected plane the two-dimensional plane corresponding to the high-resolution image of which the proportion is the largest when projected through perspective projection on the viewer's visual field range. The visual line detecting part 128 supplies the selected plane to the reception part 123 and the two-dimensional plane information regarding the selected plane to the mapping processing part 125.

Further, the visual line detecting part 128 determines the viewer's visual field range in the coordinate system of the 3D model on the basis of the viewing position and the visual line direction in the 3D model coordinate system. The visual line detecting part 128 supplies the viewer's visual field range and viewing position to the rendering part 126.

(Explanation of Mapping)

Figure 9:
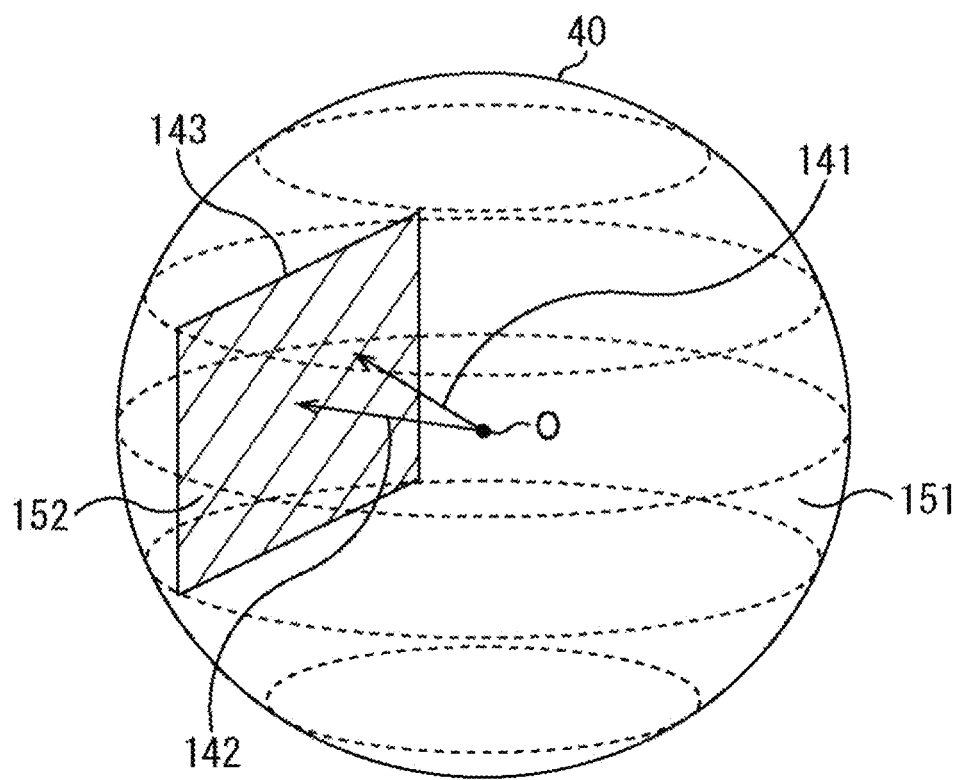
FIG. 9 is an explanatory diagram explaining how mapping is performed by a mapping processing part indicated in FIG. 8.

FIG. 9 is an explanatory diagram explaining how mapping is performed by the mapping processing part 125 indicated in FIG. 8.

In the example of FIG. 9, the viewing position is at the center O of the sphere 40. In this case, what is selected as the selected plane is a two-dimensional plane 143 with its center passed through by a normal line which extends from the center O in the direction indicated by an arrow 142 and which corresponds to the azimuth angle, elevation angle, and rotation angle that are closest to the horizontal- and vertical-direction angles formed between a visual line 141 extending from the center O in the visual line direction and the reference axis and also closest to the rotation angle of the visual line 141.

Thus the mapping processing part 125 sets the two-dimensional plane 143 as a 3D model inside the sphere 40. The mapping processing part 125 maps a low-resolution image 151 as a texture onto the sphere 40 as a 3D model, and maps a high-resolution image 152 as a texture onto the two-dimensional plane 143 as the 3D model.

The two-dimensional plane 143 is placed inside the sphere 40 in the manner described above. This enables the rendering part 126 to preferentially use the high-resolution image 152 rather than the low-resolution image 151 when perspective projection is performed on the visual field range inside of the two-dimensional plane 143 from the direction in which both the low-resolution image 151 and the high-resolution image 152 exist.

(Typical Display Images)

Figure 10:
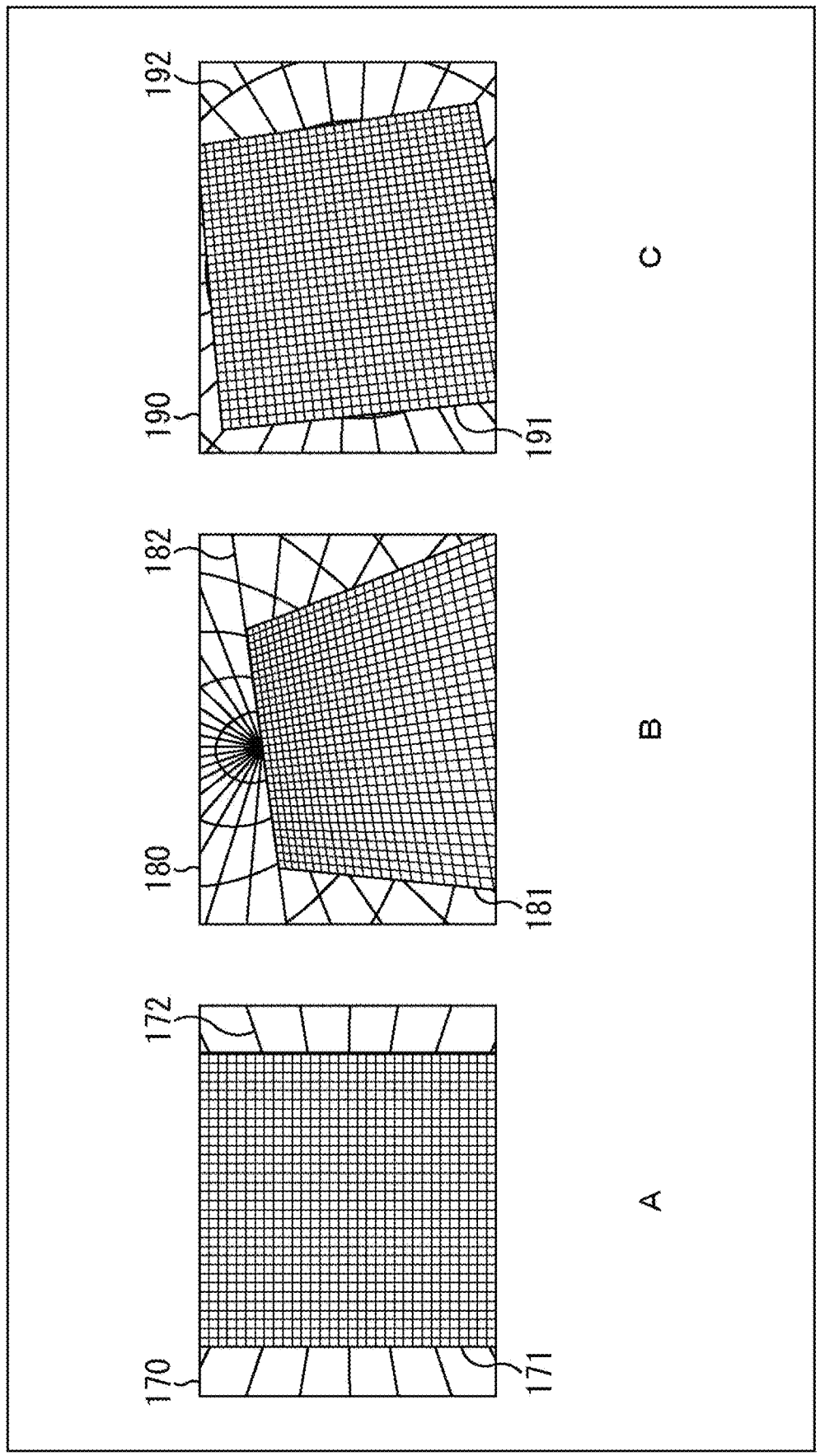
FIG. 10 is a schematic diagram depicting typical display images.

FIG. 10 is a schematic diagram depicting typical display images.

In the example of FIG. 10, the viewing position is at the center O of the sphere 40. Each rectangle in FIG. 10 is a block of 16 pixels by 16 pixels in a high- or low-resolution image. This block serves as an encoding unit in the case where the method of encoding high- and low-resolution images is the AVC method.

In the case where the viewer faces straight to a given two-dimensional plane as depicted in Subfigure A in FIG. 10, a high-resolution image 171 is placed at the center of a display image 170. In the example of Subfigure A in FIG. 10, the display image 170 is larger in size than the high-resolution image 171, so that a low-resolution image 172 is placed at both edges of the display image 170.

In the case where the viewer's visual line direction is obliquely upward as depicted in Subfigure B in FIG. 10, a high-resolution image 181 on the two-dimensional plane corresponding to the normal line closest to the visual line (i.e., two-dimensional image with the elevation angle of 45 degrees in this example) is placed at the center of the display image 180. As illustrated in Subfigure B in FIG. 10, a low-resolution image 182 is placed in the regions other than the high-resolution image 181 inside the display image 180. As depicted in Subfigure B in FIG. 10, of the display image 180, those blocks in the low-resolution image 182 which are mapped near the polar region of the sphere 40 are greater in density than those blocks in the low-resolution image 182 which are mapped near the center of the sphere 40.

In the case where the viewer's visual line direction is upward as depicted in Subfigure C in FIG. 10, the high-resolution image 181 on the two-dimensional plane corresponding to the normal line closest to the visual line (i.e., two-dimensional image with the elevation angle of 90 degrees in this example, Subfigure C in FIG. 10) is placed at the center of a display image 190. As illustrated in Subfigure C in FIG. 10, a low-resolution image 192 is placed in the regions other than the high-resolution image 191 inside the display image 190.

In the example of Subfigure C in FIG. 10, the two-dimensional plane corresponding to the high-resolution image has the elevation angle of 90 degrees. Thus the regions corresponding to the polar direction of the sphere 40 inside the display image 190 represent the high-resolution image 191. That is, those regions in the display image 40 which correspond to the polar direction of the sphere 40 and which cause a relatively large distortion of the low-resolution image constitute the high-resolution image 191 with no distortion. Thus compared with the case where the regions corresponding to the polar direction of the sphere 40 make up the low-resolution image 192, the display image 190 is allowed to present high image quality.

Incidentally, as depicted in Subfigures A to C in FIG. 10, the low-resolution image 172 (182, 192) is lower in resolution than the high-resolution image 171 (181, 191). It follows that those regions in the display image 170 (180, 190) where blocks of the low-resolution image 172 (182, 192) are placed are larger in size than those regions in the display image 170 (180, 190) where blocks of the high-resolution image 171 (181, 191) are placed.

In the examples of Subfigures A to C in FIG. 10, as described above, the high-resolution image 171 (181, 191) is placed in the central regions whose resolution significantly affects the sense of vision among all regions of the display image 170 (180, 190). Thus compared with the case where the low-resolution image 172 (182, 192) is placed at the center of the display image 170 (180, 190), the display image 170 (180, 190) in these examples presents improved image quality.

(Explanation of the Process Performed by the Reproduction Apparatus)

Figure 11:
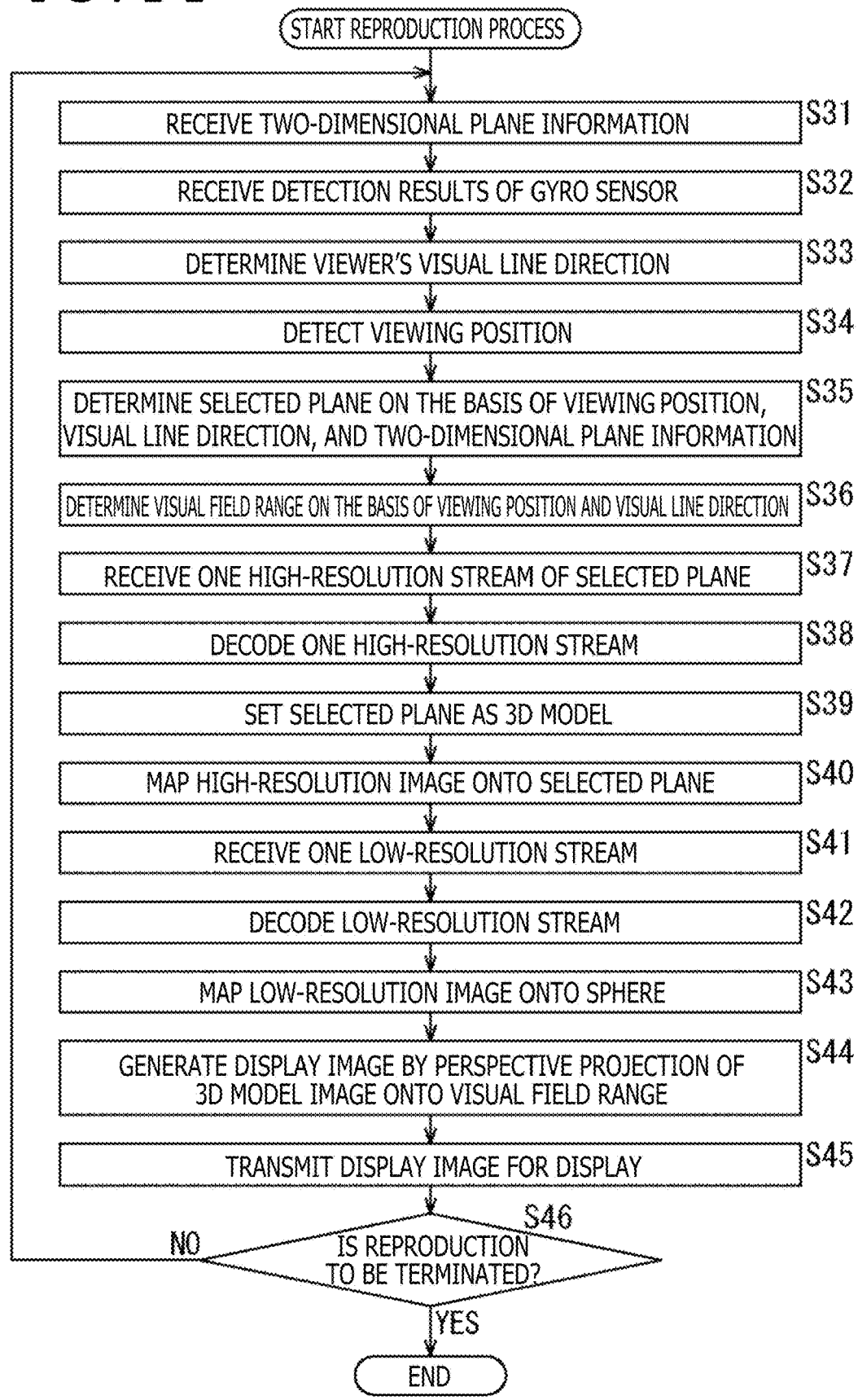
FIG. 11 is a flowchart explaining a reproduction process performed by the reproduction apparatus indicated in FIG. 8.

FIG. 11 is a flowchart explaining the reproduction process performed by the reproduction apparatus 15 indicated in FIG. 8. The reproduction process is started in response to the viewer's request, for example.

In step S31 of FIG. 11, the reception part 121 of the reproduction apparatus 15 requests two-dimensional plane information to the delivery server 13 and receives the two-dimensional plane information transmitted from the transmission part 103 in response to the request. The reception part 121 supplies the two-dimensional plane information to the visual line detecting part 128.

In step S32, the acceptance part 127 receives detection results of the gyro sensor 16B in FIG. 2 from the head-mounted display 16, and supplies the detection results to the visual line detecting part 128.

In step S33, the visual line detecting part 128 determines the viewer's visual line direction in the coordinate system of the 3D model on the basis of the detection results of the gyro sensor 16B supplied from the acceptance part 127.

In step S34, the visual line detecting part 128 acquires a captured image of the marker 16A from the camera 15A and, based on the captured image, detects the viewing position in the 3D model coordinate system.

In step S35, the visual line detecting part 128 determines as the selected plane one of the five two-dimensional planes that is closest to the viewer's visual line on the basis of the viewing position and the visual line direction in the 3D model coordinate system as well as the two-dimensional plane information supplied from the reception part 121. The visual line detecting part 128 supplies selected-plane information regarding the selected plane to the reception part 123 and the two-dimensional plane information regarding the selected plane to the mapping processing part 125.

In step S36, the visual line detecting part 128 determines the viewer's visual field range in the 3D model coordinate system on the basis of the viewing position and the visual line direction in the 3D model coordinate system. The visual line detecting part 128 supplies the viewer's visual field range and viewing position to the rendering part 126.

In step S37, the reception part 123 requests the delivery server 13 for one high-resolution stream of the selected plane identified by the selected-plane information supplied from the visual line detecting part 128. The reception part 123 receives the single high-resolution stream transmitted from the transmission part 104 in response to the request. The reception part 123 supplies the received high-resolution steam to the decoder 124.

In step S38, the decoder 124 decodes the single high-resolution stream supplied from the reception part 123 to generate a high-resolution image. The decoder 124 supplies the high-resolution image to the mapping processing part 125.

In step S39, the mapping processing part 125 sets as a 3D model the selected plane inside a sphere set beforehand as a 3D model, on the basis of the two-dimensional plane information regarding the selected plane supplied from the visual line detecting part 128.

In step S40, the mapping processing part 125 maps the high-resolution image supplied from the decoder 124 onto the selected plane set as the 3D model.

In step S41, the reception part 121 requests the delivery server 13 for one low-resolution stream, and receives the single low-resolution stream transmitted from the transmission part 103 in response to the request. The reception part 121 supplies the low-resolution stream to the decoder 122.

In step S42, the decoder 122 decodes the low-resolution stream supplied from the reception part 121 to generate a low-resolution image. The decoder 122 supplies the low-resolution image to the mapping processing part 125.

In step S43, the mapping processing part 125 maps as a texture the low-resolution image from the decoder 122 onto the sphere as the 3D model. The mapping processing part 125 supplies the rendering part 126 with a 3D model image having the textures mapped onto the sphere and the two-dimensional plane.

In step S44, the rendering part 126 performs perspective projection of the 3D model image from the mapping processing part 125 on the viewer's visual field range using as the focal point the viewing position supplied from the visual line detecting part 128, thereby generating an image of the viewer's visual field range as the display image.

In step S45, the rendering part 126 transmits the display image to the head-mounted display 16 for display thereon. In step S46, the reproduction apparatus 15 determines whether or not to terminate the reproduction, e.g., whether the viewer has requested termination of the reproduction.

In the case where it is determined in step S46 that the reproduction is not to be terminated, control is returned to step S31. The processing from step S31 to step S46 is then repeated until the reproduction is determined to be terminated. On the other hand, in the case where it is determined in step S46 that the reproduction is to be terminated, the reproduction is brought to an end.

In the foregoing paragraphs, it was explained that the number of two-dimensional planes is five. However, the number of two-dimensional planes is not limited to five. The larger the number of two-dimensional planes, the closer to the viewer's visual line the normal line corresponding to the high-resolution image that can be used by the reproduction apparatus 15 to generate the display image. This increases the proportion of the high-resolution image in the display image, which raises the image quality of the display image. However, given a larger number of high-resolution streams, there is an increase in the amount of throughput handled by the generation apparatus 12 in generating the high-resolution stream as well as an increase in the required capacity of the storage 102.

Also, the two-dimensional plane table may be arranged to let two-dimensional plane information, horizontal pixel counts, and vertical pixel counts other than their fixed values be registered therein. Further, the two-dimensional planes may be set in units of at least one frame or in units of a scene.

Second Example of Two-Dimensional Planes

Figure 12:
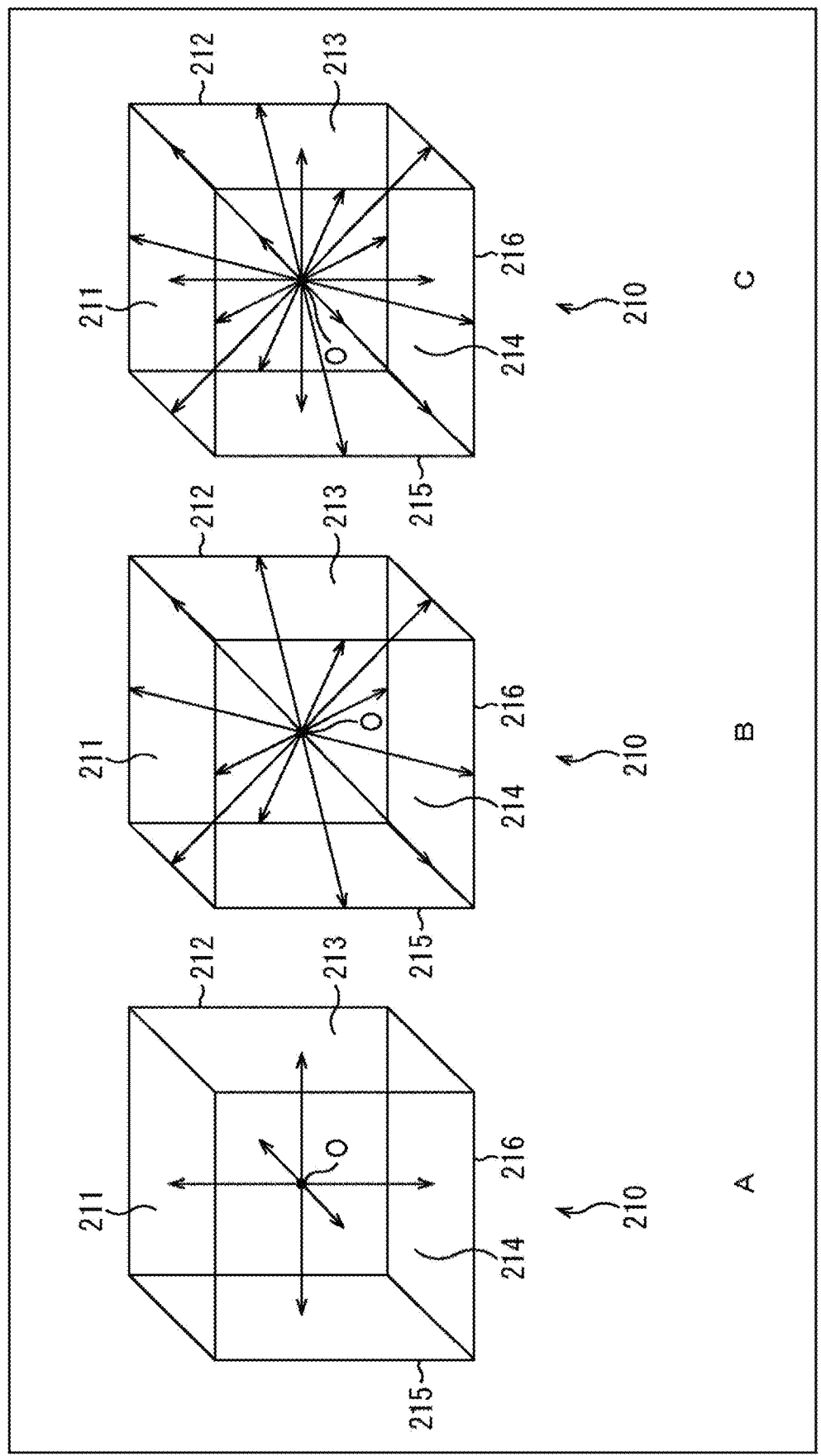
FIG. 12 is a schematic diagram depicting a second example of two-dimensional planes.

FIG. 12 is a schematic diagram depicting typical two-dimensional planes in cases where the number of two-dimensional planes is other than five.

Incidentally, arrows in FIG. 12 each denote a normal line passing through the center of each two-dimensional plane.

As depicted in Subfigure A in FIG. 12, the setting part 25 may set six planes 211 to 216 of a cube 210 centering on the center O of the sphere 40 as the two-dimensional planes. In this case, the normal lines passing through the centers of the six two-dimensional planes constitute a total of six lines passing through the center O in both directions of each of three axes that are perpendicular to each other. Also, the horizontal and vertical angles of view are 90 degrees for all two-dimensional planes with no overlaps therebetween.

In this case, that is, the high-resolution images on the two-dimensional planes are images obtained by dividing the omnidirectional image generated through cube mapping onto the individual faces of a cube as a 3D model. Incidentally, cube mapping is a method by which images are mapped onto the cube as the 3D model before the cube mapped with the image is unfolded to generate an omnidirectional image.

Also, as depicted in Subfigure B in FIG. 12, the setting part 25 may set 12 two-dimensional planes in such a manner that the normal lines passing through the centers of the two-dimensional planes may be lines that pass through the center O and the midpoint of each of the 12 sides of the cube 210. In this case, compared with the case in Subfigure A of FIG. 12, the angle between two adjacent two-dimensional planes is small. This allows the reproduction apparatus 15 to determine as the selected plane the two-dimensional plane corresponding to the normal line that is closest to the visual line. As a result, the proportion of the high-resolution image inside the display image is raised, which improves the image quality of the display image.

Furthermore, as illustrated in Subfigure C in FIG. 12, the setting part 25 may set 18 two-dimensional planes in such a manner that the normal lines passing through the centers of the two-dimensional planes are lines that pass through both the center O and the midpoint of each of the 12 sides of the cube 210, and lines also passing through the center O and the center of each of the six planes 211 to 216 of the cube 210. In this case, the two-dimensional planes are the planes 211 to 216 and those in Subfigure B in FIG. 12.

In the examples in Subfigures A and C of FIG. 12, all high-resolution images corresponding to the planes 211 to 216 may be used to generate the display image corresponding to all visual line directions in the 360-degree circumference in the horizontal direction and in the 180-degree circumference in the vertical direction.

(Other Typical Methods for Generating the Omnidirectional Image)

In the foregoing paragraphs, it was explained that the omnidirectional image is generated by the method based on equidistant cylindrical projection. However, this is not imitative of methods for generating the omnidirectional image.

Figure 13:
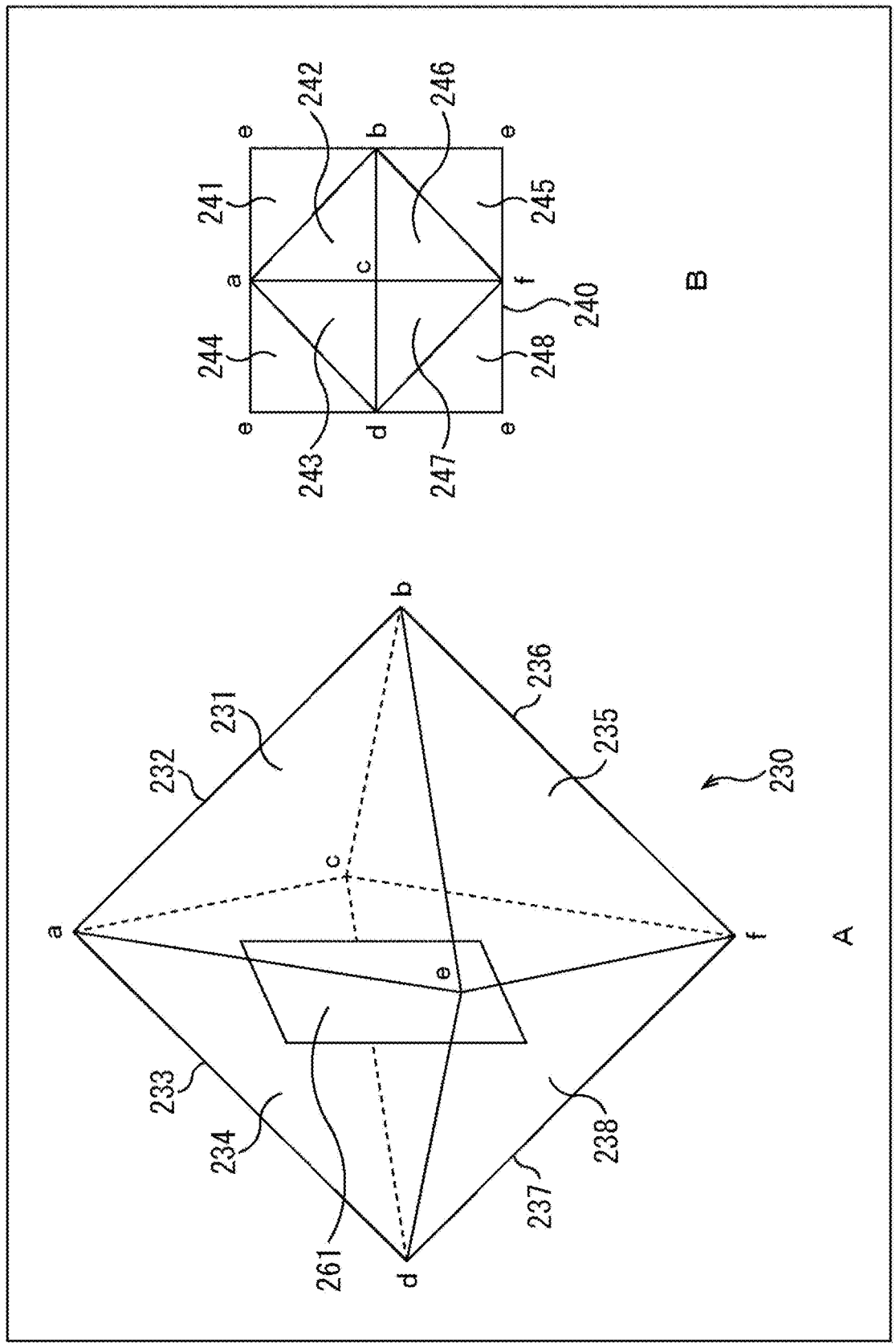
FIG. 13 is an explanatory diagram explaining a typical method of generating an omnidirectional image.

FIG. 13 is an explanatory diagram explaining a typical method of generating an omnidirectional image in a manner different from the method based on equidistant cylindrical projection.

According to the method of omnidirectional image generation in FIG. 13, captured images are mapped onto a regular octahedron 230 as a 3D model, as depicted in Subfigure A in FIG. 13. The images mapped onto equilateral-triangle planes 231 to 238 of the regular octahedron 230 are each shaped into a right triangle. Right-triangle images 241 to 248 are then combined to generate a square omnidirectional image 240 as illustrated in Subfigure B in FIG. 13.

In the case where the omnidirectional image is generated by the method depicted in FIG. 13, a two-dimensional plane 261 is placed inside the regular octahedron 230. Also, the 3D model onto which low-resolution images are mapped by the mapping processing part 125 is the regular octahedron 230.

Besides the method illustrated in FIG. 13, the omnidirectional image may be generated by use of cube mapping, for example. Furthermore, the method of generating the omnidirectional image before down-conversion of low-resolution images may be different from the method of generating the omnidirectional image for use in generating high-resolution images.

(Other Typical Low-Resolution Images)

Figure 14:
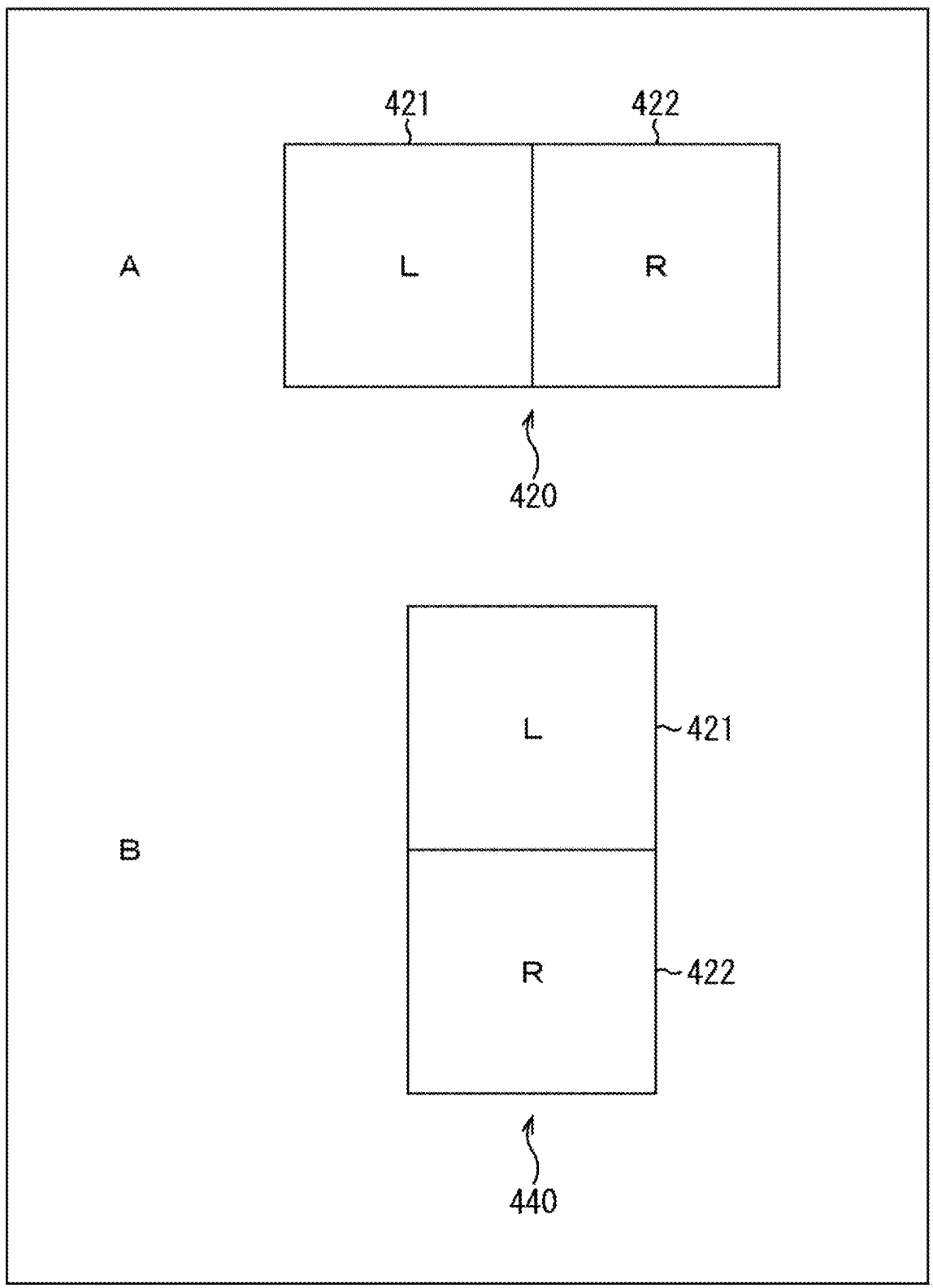
FIG. 14 is a schematic diagram depicting other typical low-resolution images.

FIG. 14 is a schematic diagram depicting other typical low-resolution images.

In the foregoing paragraphs, it was explained that the omnidirectional image from a single viewpoint is down-converted to the low-resolution image. Alternatively, an omnidirectional image from the left-eye viewpoint and an omnidirectional image from the right-eye viewpoint may be down-converted into low-resolution images that are then combined (packed).

Specifically, as depicted in Subfigure A in FIG. 14, the low-resolution image may be a packed image 420 (low-resolution packed image) in which two low-resolution images are packed crosswise (in the horizontal direction), for example, i.e., a low-resolution image 421 obtained by down-converting the omnidirectional image from the left-eye viewpoint, and a low-resolution image 422 acquired by down-converting the omnidirectional image from the right-eye viewpoint.

Alternatively, as depicted in Subfigure B in FIG. 14, the low-resolution image may be a packed image 440 (low-resolution packed image) in which two low-resolution images are packed lengthwise (in the vertical direction), for example, i.e., the low-resolution image 421 obtained by down-converting the omnidirectional image from the left-eye viewpoint, and the low-resolution image 422 acquired by down-converting the omnidirectional image from the right-eye viewpoint.

Likewise, the high-resolution image on each two-dimensional plane may be a packed image (high-resolution packed image) in which two high-resolution images are packed crosswise or lengthwise, i.e., a high-resolution image from the left-eye viewpoint for the two-dimensional plane, and a high-resolution image from the right-eye viewpoint for the two-dimensional plane. The high-resolution image from the left-eye viewpoint on a given two-dimensional plane is obtained by perspective projection, on that two-dimensional plane, of the omnidirectional image from the left-eye viewpoint mapped onto a sphere using the center of the sphere as the focal point. The high-resolution image from the right-eye viewpoint on a given two-dimensional plane is acquired by perspective projection, on that two-dimensional plane, of the omnidirectional image from the right-eye viewpoint mapped onto the sphere using the center of the sphere as the focal point.

In the case where the low- and the high-resolution images are packed images, the mapping processing part 125 in FIG. 8 divides the packed images obtained through decoding by the decoder 122 into a low-resolution image from the left-eye viewpoint and a low-resolution image from the right-eye viewpoint. Also, the mapping processing part 125 divides the packed images obtained through decoding by the decoder 124 into a high-resolution image from the left-eye viewpoint and a high-resolution image from the right-eye viewpoint. The mapping processing part 125 then generates a 3D model image for the left-eye viewpoint and another 3D model for the right-eye viewpoint. Using the 3D model images, the rendering part 126 generates a display image for the left-eye viewpoint and a display image for the right-eye viewpoint.

This allows the head-mounted display 16, if it is capable of 3D display, to display a 3D display image by presenting the display image from the left-eye viewpoint and the display image from the right-eye viewpoint as a left-eye image and a right-eye image, respectively.

As described above, the generation apparatus 12 in the delivery system 10 generates high-resolution images by perspective projection of the omnidirectional image on multiple two-dimensional planes. Consequently, the high-resolution images on the 3D model are not distorted in shape.

Thus the reproduction apparatus 15 can generate the display image using the isotropic high-resolution images. As a result, the display image in all visual directions is made approximately uniform in image quality. Also, using high-resolution image regions in the display image, it is possible to perform general image processing such as facial recognition, of which the accuracy is significantly affected by distortion.

Also, because the motion on the 3D model matches the motion in the high-resolution images, the high-resolution images can be encoded with high precision using motion compensation. Furthermore, the bits are uniformly distributed throughout the high-resolution images.

Also, the reproduction apparatus 15 requests the delivery server 13 for only the high-resolution stream of the two-dimensional plane corresponding to the visual line direction and receives the high-resolution stream from the delivery server 13. Thus compared with the case in which the high-resolution streams of all two-dimensional planes are received, the transmission amount between the delivery server 13 and the reproduction apparatus 15 is reduced.

Furthermore, the generation apparatus 12 generates the low-resolution image by down-converting the entire omnidirectional image. Thus even in cases where the display image corresponds to a region other than the high-resolution images or where the viewer's visual line direction abruptly changes, the generation apparatus 12 can generate the display image using the low-resolution image. Also, the delivery system 10 is compatible with reproduction apparatuses that reproduce only the encoded stream of the entire omnidirectional image.

Also, the generation apparatus 12 receives the low-resolution stream and the high-resolution stream of the selected plane so as to generate the display image. Thus compared with the case where the display image is generated upon receipt of the encoded stream of the omnidirectional image at one resolution, the resolution of the display image is increased while the transmission amount and the amount of throughput are kept the same.

Furthermore, the generation apparatus 12 can set the two-dimensional planes in a manner positioned, inclined, and scaled as needed. Thus the generation apparatus 12 can generate the high-resolution image corresponding to any visual line direction. On the other hand, in the case where the high-resolution image is generated by dividing the omnidirectional image generated by the method based on equidistant cylindrical projection, it is difficult to generate, as the high-resolution image, an image mapped onto that polar region of the sphere 40 in a manner stretching crosswise in the omnidirectional image.

Also, the generation apparatus 12 generates from captured images the omnidirectional image for use in generating the low-resolution image, and further generates the high-resolution images from the omnidirectional image. Thus using the high- and low-resolution images, the reproduction apparatus 15 can generate the display image in which high- and low-resolution image region's are contiguous with each other without giving a sense of discomfort, as opposed to the case where captured images are used unmodified as the high-resolution images.

Alternatively, a two-dimensional plane may be set for high density corresponding to an important range of visual line directions in which a target object presumed to be important for the viewer is viewed, the two-dimensional plane being further set or not set at all for low-density corresponding to ranges other than the important range. In this case, when the viewer's visual line is within the important range, the reproduction apparatus 15 can generate the display image using the high resolution of the two-dimensional plane corresponding to the normal line closest to the visual line. This increases the proportion of the high-resolution image in the display image, which raises the image quality of the display image. Also, given a reduced number of high-resolution streams corresponding to the ranges other than the important range, the increase in the number of high-resolution streams is minimized.

As another alternative, the high-resolution stream, low-resolution stream, and two-dimensional plane table may be delivered in real time (delivered live) from the reception part 101 to the reproduction apparatus 15 via the transmission parts 103 and 104 without being stored in the storage 102.

In the foregoing paragraphs, it was explained that the captured images are moving images. Alternatively, the captured images may be still images. Also, the selected-plane count is not limited to one.

The delivery system 10 may be equipped with a stationary display unit in place of the head-mounted display 16. In this case, the reproduction apparatus 15 is not furnished with the camera 15A. The viewing position and the visual line direction are input by the viewer operating a controller connected with the reproduction apparatus 15 or with the stationary display unit.

Alternatively, the delivery system 10 may be equipped with a mobile terminal instead of the reproduction apparatus 15 and head-mounted display 16. In this case, the mobile terminal takes over the processes of the reproduction apparatus 15 except for those of the camera 15A, and causes the display image to appear on a display unit of the mobile terminal. The viewer inputs the viewing position and the visual line direction by changing the attitude of the mobile terminal. The mobile terminal acquires the input viewing position and visual line direction by allowing an internal gyro sensor to detect the attitude of the mobile terminal.

Second Embodiment

A second embodiment of the delivery system to which the present disclosure is applied is configured the same as the delivery system 10 in FIG. 2 except that perspective projection is replaced with tangential axial projection (to be discussed later in detail). The ensuing explanation will thus concentrate on tangential axial projection.
(Explanation of the Coordinate System of the Projection Plane)

Figure 15:
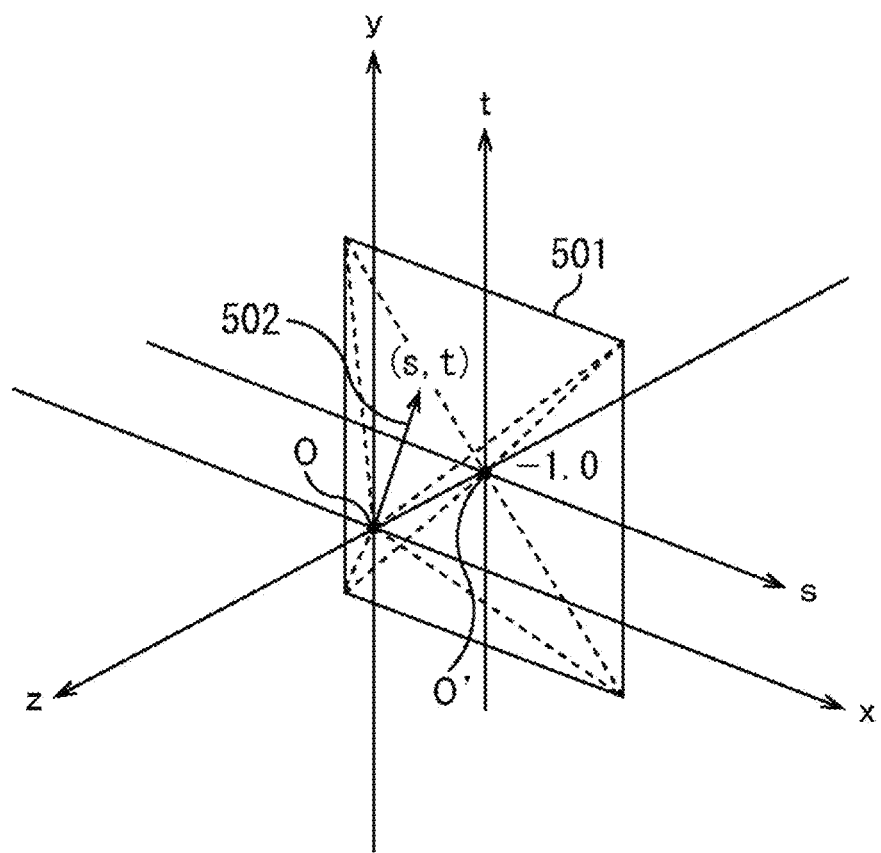
FIG. 15 is an explanatory diagram explaining a projection plane coordinate system.

FIG. 15 is an explanatory diagram explaining a projection plane coordinate system.

It is to be noted that in the second embodiment, the projection plane is either a two-dimensional plane on which an omnidirectional image mapped onto a sphere is projected by tangential axial projection when the generation apparatus 12 generates high-resolution images, or the visual field range on which a 3D model image is projected by tangential axial projection when the reproduction apparatus 15 generates the display image.

In the example of FIG. 15, a projection plane 501 is set with the z-axis at −1.0 in a 3D xyz-coordinate system of a 3D model. In this case, the coordinate system of the projection plane 501 is a 2D st-coordinate system where the origin is at the center O' of the projection plane 501 and where the horizontal and vertical directions of the plane 501 are in the s-direction and t-direction, respectively.

In the ensuing paragraphs, a vector 502 extending from the origin O of the xyz-coordinate system to coordinates (s, t) of the st-coordinate system will be referred to as the vector (s, t, −1.0) using the coordinates (s, t) and the distance of −1.0 from the origin O to the projection plane 501.
(Explanation of Tangential Axial Projection)

Figure 16:
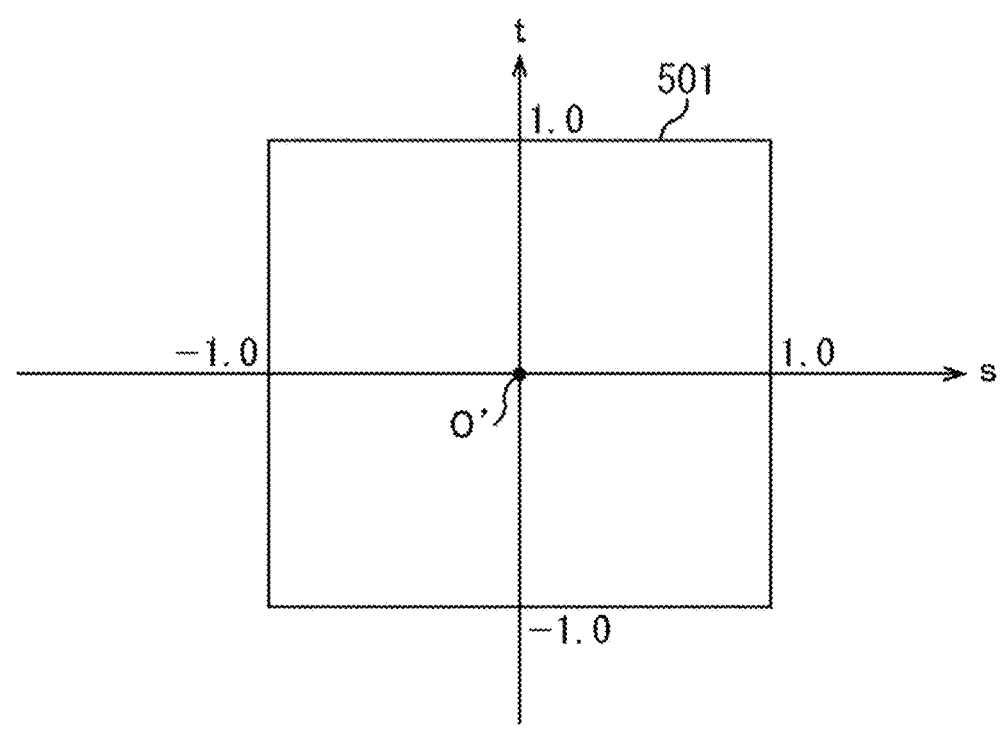
FIG. 16 is an explanatory diagram explaining tangential axial projection.

FIG. 16 is an explanatory diagram explaining tangential axial projection (projection along tangential axes).

FIG. 16 depicts the projection plane 501 as viewed in the negative z-direction. The example in FIG. 16 illustrates the st-coordinate system where the s- and t-values of the projection plane 501 are −1.0 each when minimized and 1.0 each when maximized.

In this case, projection points in perspective projection are set on the projection plane 501 is such a manner that the projection vector extending from the origin O to each projection point on the projection plane 501 becomes the vector (s', t', −1.0). Here, s' stands for the value of each of the intervals making up the range of s-values from −1.0 to 1.0, and t' denotes the value of each of the intervals constituting the range of t-values from −1.0 to 1.0. Thus the projection points are evenly spaced on the projection plane 501.

By contrast, if the angle of view of the projection plane 501 is assumed to be θw (π/2 in the example of FIG. 16), projection points in tangential axial projection are set on the projection plane 501 in such a manner that the projection vector becomes a vector (tan(s'*θw/2), tan(t'*θw/2), −1.0).

Specifically, if s'*θw/2 stands for θ and t'*θw/2 for φ, then the vector (tan(s'*θw/2), tan(t'*θw/2), −1.0) is given as a vector (tan θ, tan φ, −1.0). In this case, when the angle of view θw approaches π, tan θ and tan φ diverge to infinity. Thus the projection points are set on the projection plane 501 in such a manner that the vector (tan θ, tan φ, −1.0) is corrected into the vector (sin θ*cos φ, cos θ*sin φ, −cos θ*cos φ) and that the projection vector becomes the vector (sin θ*cos φ, cos θ*sin φ, −cos θ*cos φ) so as to prevent tan θ and tan φ from diverging to infinity. As a result, in tangential axial projection, the angle between the projection vectors corresponding to adjacent projection points remains the same.

Incidentally, as in the case of logarithmic axes (log scales), tan(s'*θw/2) and tan(t'*θw/2) are considered to represent s' and t' along the tangential axes. Thus in this description, tangential axial projection is defined as the projection by which the projection vector is turned into the vector (tan(s'*θw/2), tan(t'*θw/2), −1.0).
(Explanation of Projection Points in Perspective Projection and in Tangential Axial Projection)

Figure 17:
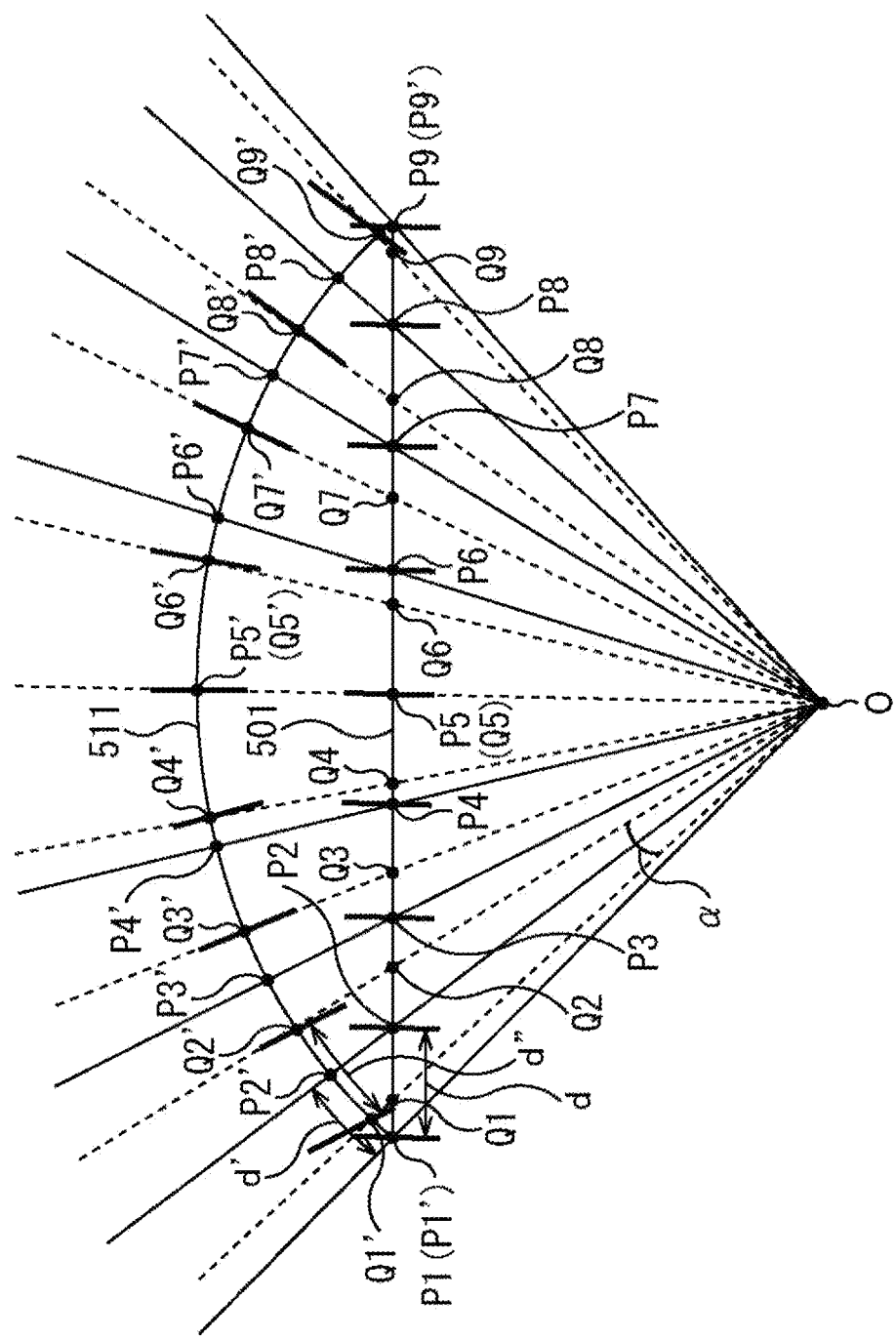
FIG. 17 is an explanatory diagram explaining projection points in perspective projection and in tangential axial projection.

FIG. 17 is an explanatory diagram explaining projection points in perspective projection and in tangential axial projection.

FIG. 17 depicts the projection plane 501 as viewed in the negative y-direction. In the example of FIG. 17, nine projection points are placed on the projection plane 501.

In this case, as depicted in FIG. 17, the projection points P1 to P9 in perspective projection are spaced at the same interval d on the projection plane 501. Therefore, those points P1' to P9' on an omnidirectional image mapped onto a sphere 511 which correspond to the projection points P1 to P9 are spaced at an interval d' that varies. That is, the closer the projection points are to the center of the projection plane 501, the longer the interval d' therebetween since the interval d' is dependent on the projection vector.

In tangential axial projection, by contrast, projection points Q1 to Q9 are spaced in such a manner that the angle between the projection vectors corresponding to adjacent projection points constitutes the same angle α. Thus those points Q1' to Q9' on the omnidirectional image mapped onto the sphere 511 which correspond to the projection points Q1 to Q9 are spaced at the same interval d".
(Typical Pixels of an Omnidirectional Image on High-Resolution Images Generated by Perspective Projection and by Tangential Axial Projection)

Figure 18:
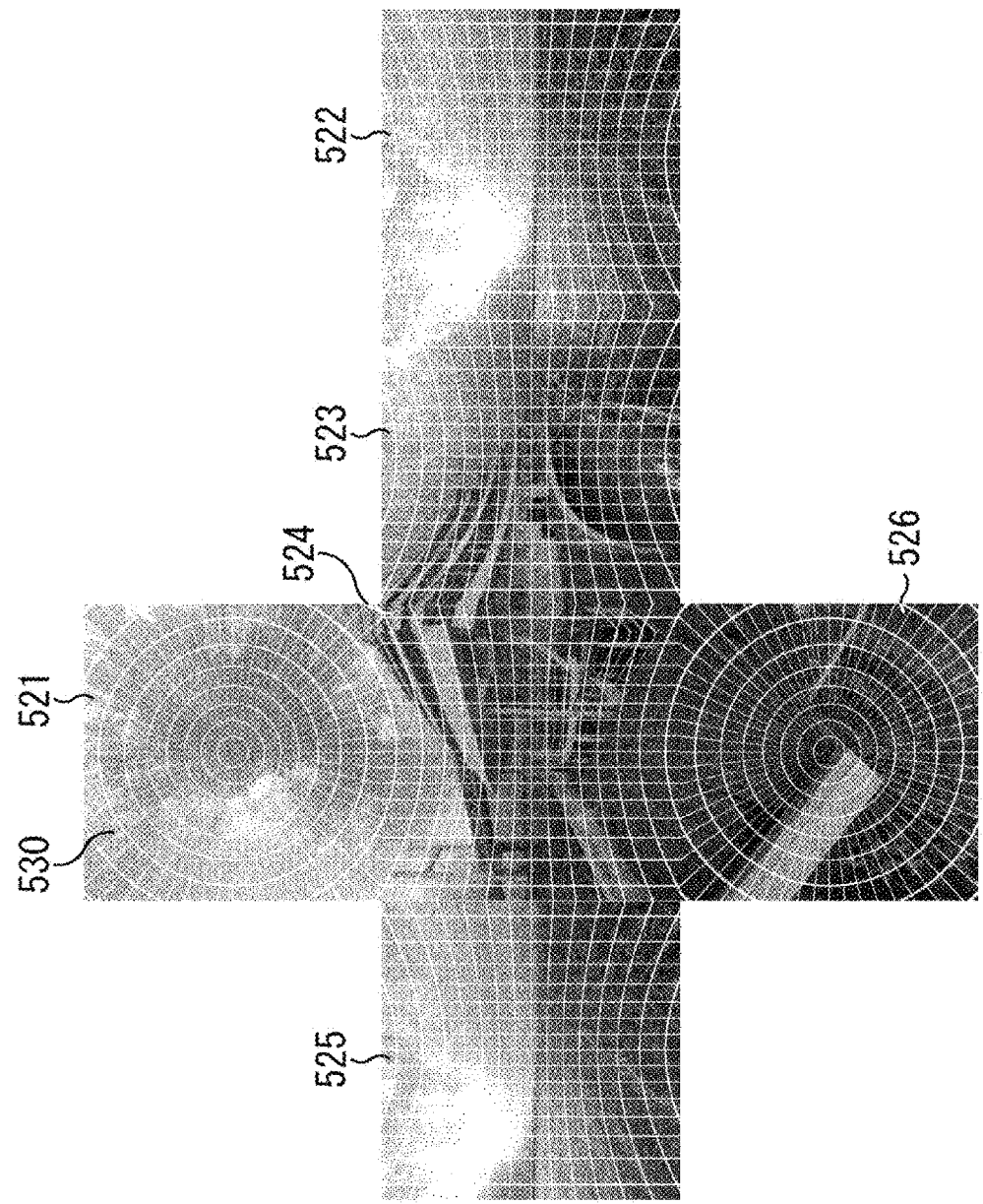
FIG. 18 is a schematic diagram depicting typical pixels of an omnidirectional image on high-resolution images generated by perspective projection.
Figure 19:
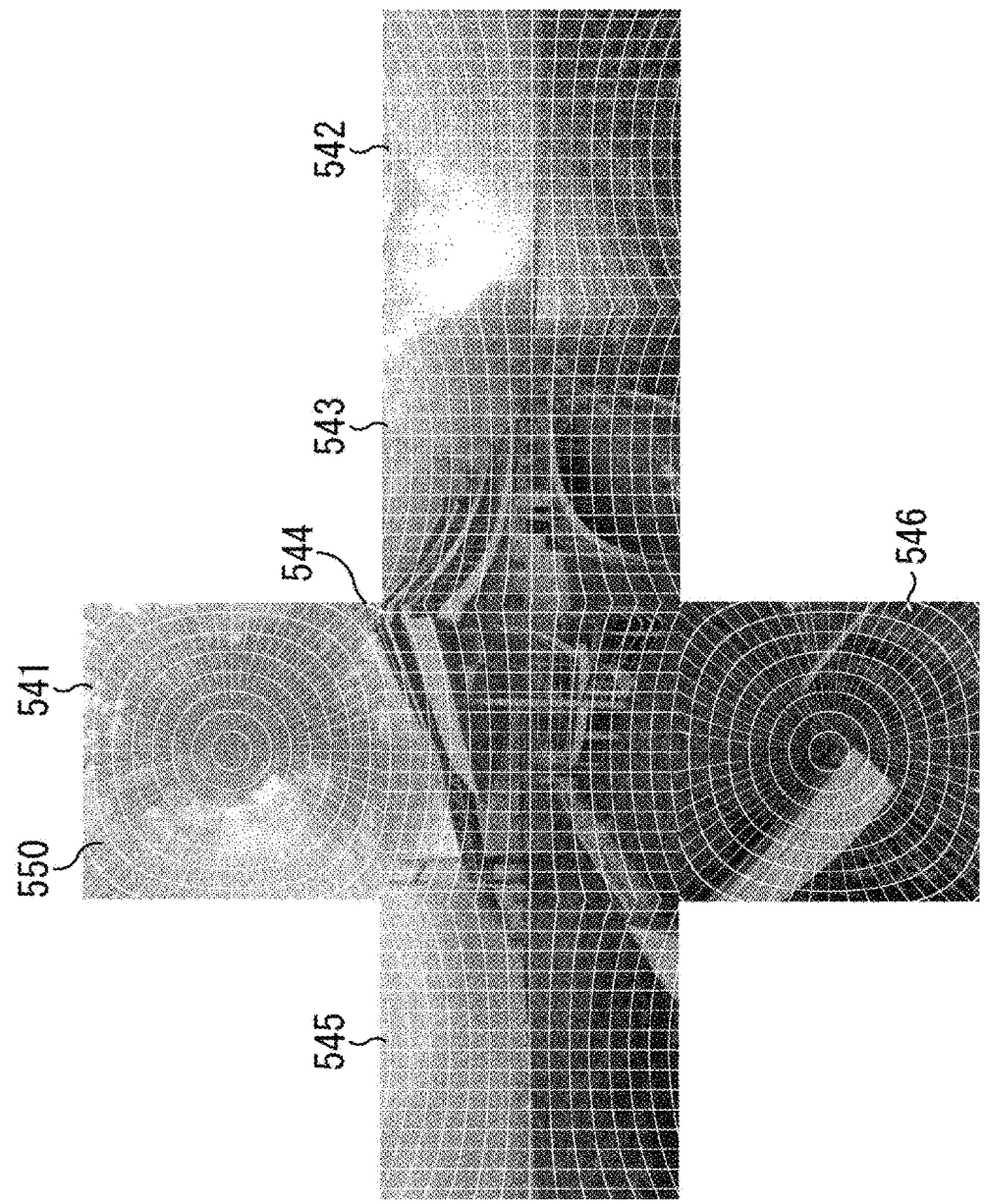
FIG. 19 is a schematic diagram depicting typical pixels of an omnidirectional image on high-resolution images generated by tangential axial projection.

FIG. 18 is a schematic diagram depicting typical pixels of an omnidirectional image on high-resolution images generated by perspective projection. FIG. 19 is a schematic diagram illustrating typical pixels of an omnidirectional image on high-resolution images generated by tangential axial projection.

Incidentally, in FIGS. 18 and 19, the boundaries between the pixels of the omnidirectional image on the high-resolution images are indicated by white lines. This also applies to FIG. 20 in similar way, to be discussed later. Also in the examples of FIGS. 18 and 19, the two-dimensional planes constituting the projection planes are six planes 211 to 216 in Subfigure A in FIG. 12. This also applies to FIG. 21, to be discussed later.

In this case, as illustrated in FIG. 18, the closer to the center of the screen, the higher the density of pixels 530 (rectangles enclosed by white lines) of the omnidirectional image on high-resolution images 521 to 526 generated by perspective projection, on the planes 211 to 216, of the pixels of the omnidirectional image mapped onto the sphere.

That is, in the case of perspective projection in which the projection points are spaced equal distances apart on the planes 211 to 216, the closer to the center of the planes 211 to 216, the lower the density of the points per unit angle that correspond to the projection points in the omnidirectional image mapped onto the sphere. Thus the closer to the center of the screen, the higher the density of the pixels 530 of the omnidirectional image on the high-resolution images 521 to 526.

By contrast, as depicted in FIG. 19, pixels 550 (rectangles enclosed by white lines in the drawing) of the omnidirectional image on high-resolution images 541 to 546 generated by tangential axial projection, on the planes 211 to 216, of the pixels of the omnidirectional image mapped onto the sphere are approximately uniform in density.

That is, in the case of tangential axial projection in which the points corresponding to the projection points are spaced equal distances apart on the omnidirectional image mapped onto the sphere, the corresponding points are more uniform in density per unit angle than in the case of perspective projection. That means the pixels 550 of the omnidirectional image on the high-resolution images 541 to 546 are approximately uniform in density. As a result, the image quality of the high-resolution images 541 to 546 is higher than the image quality of the high-resolution images 521 to 526 on which the pixels of the omnidirectional image are not uniform in density.

Incidentally, the boundaries between the pixels 550 of the high-resolution images 541 and 546 do not form concentric circles. Thus the high-resolution images 541 and 546 are different from captured images acquired by use of a fish-eye lens. The high-resolution images 521 to 526 are interconvertible with the high-resolution images 541 and 546 respectively because each of these images is obtained by projecting the same region of the omnidirectional image.

Figure 20:
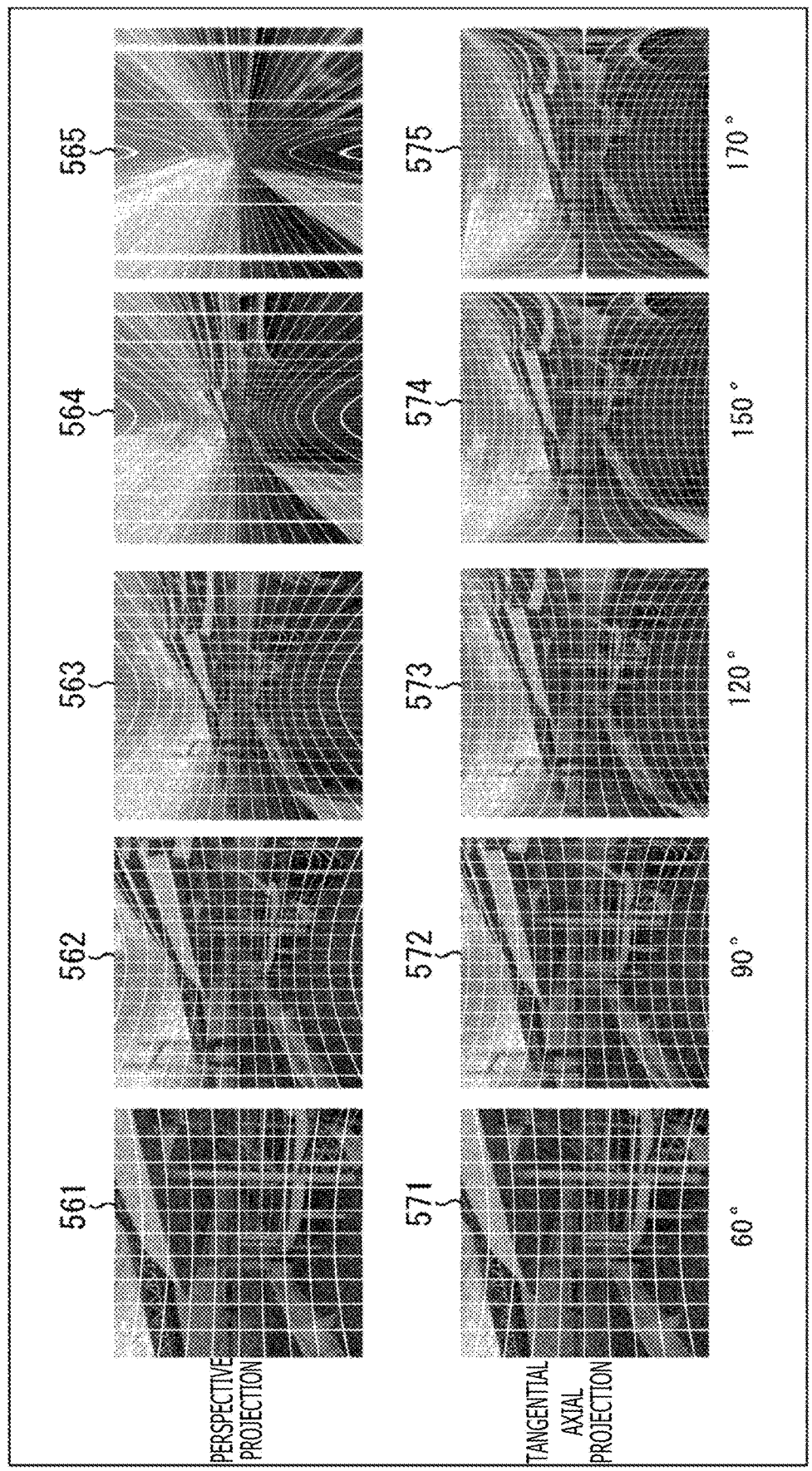
FIG. 20 is a schematic diagram depicting other typical pixels of an omnidirectional image on high-resolution images generated by perspective projection and tangential axial projection.

FIG. 20 is a schematic diagram depicting other typical pixels of an omnidirectional image on high-resolution images generated by perspective projection and tangential axial projection.

The upper portion of FIG. 20 illustrates high-resolution images 561 to 565 generated by perspective projection on two-dimensional planes at angles of view θw of 60°, 90°, 120°, 150°, and 170°.

The lower portion of FIG. 20 depicts high-resolution images 571 to 575 generated by tangential axial projection on two-dimensional planes at angles of view θw of 60°, 90°, 120°, 150°, and 170°.

As illustrated in the upper portion of FIG. 20, the larger the angle of view θw, the greater the difference in density between the positions on the screen of the pixels of the omnidirectional image on the high-resolution images 561 to 565 generated by perspective projection. On the other hand, as depicted in the lower portion of FIG. 20, the positions on the screen of the pixels of the omnidirectional image on the high-resolution images 571 to 575 generated by tangential axial projection are approximately uniform in density. It follows that the larger the angle of view θw, the higher the image quality of the high-resolution images 571 to 575 generated by tangential axial projection as opposed to the high-resolution images 561 to 565 generated by perspective projection.

Furthermore, the larger the angle of view θw, the higher the density of the pixels at the screen center of the omnidirectional image on the high-resolution images 561 to 565 generated by perspective projection. Consequently, the resolution at the screen center of the high-resolution image 563 with the angle of view θw of 120°, for example, is lower than the resolution of the high-resolution image 562 with the angle of view θw of 90°.

Whereas the larger the angle of view θw, the higher the density of the pixels of the omnidirectional image on the entire high-resolution images 571 to 575 generated by tangential axial projection, these pixels on the screen are approximately uniform in density. Thus the larger the angle of view θw, the more suppressed an increase in the density of the pixels of the omnidirectional image at the screen center in tangential axial projection than in perspective projection.

For example, the pixels at the screen center of the omnidirectional image on the high-resolution image 573 having the angle of view θw of 120° and generated by tangential axial projection are approximately the same in density as the pixels at the screen center of the omnidirectional image on the high-resolution image 562 having the angle of view of 90° and generated by perspective projection. As a result, the resolution of the important region at the screen center is made higher by tangential axial projection than by perspective projection.

It is to be noted that although not illustrated, if the high-resolution images 521 to 526 are mapped as textures onto the faces of a cube by perspective projection in such a manner that the boundary between two adjacent faces is projected on the screen center, the pixels of the omnidirectional image generated by perspective projection are higher in density the closer to the boundary. Likewise, in the case of perspective projection by which the boundaries between three adjacent faces are projected on the screen center, the pixels of the omnidirectional image generated by perspective projection are higher in density the closer to the boundaries. That is, the pixels of the omnidirectional image generated by perspective projection from approximately the top of the cube that is mapped with the high-resolution images 521 to 526 are higher in density than the pixels of the other regions.

(Typical Structure of the Two-Dimensional Plane Table)

FIG. 21 is a tabular diagram indicating a typical structure of a two-dimensional plane table for the second embodiment of the disclosure.

The two-dimensional plane table in FIG. 21 is configured the same as the table in FIG. 6 except that the method of projection onto two-dimensional planes is registered anew as the projection method. Specifically, since the method of projection onto two-dimensional planes with the second embodiment is tangential axial projection, the two-dimensional plane table in FIG. 21 has tangential axial projection registered therein as the projection method corresponding to each of the IDs of 1 to 5.

Alternatively, with the first embodiment, the projection method may also be registered in the two-dimensional plane table in the similar as with the second embodiment. As another alternative, with the second embodiment, the projection method may not be registered in the two-dimensional plane table as with the first embodiment.

With the second embodiment, as described above, high-resolution images are generated by tangential axial projection, on two-dimensional planes, of the omnidirectional image mapped onto the sphere. This improves the image quality of the high-resolution images. Also, the display image is generated by tangential axial projection of the 3D model image on the visual field range, which improves the image quality of the display image.

It is to be noted that the high-resolution images or the display may be generated by a projection method other than perspective projection or tangential axial projection. Also, the projection method may vary from one two-dimensional plane to another.

Third Embodiment (Explanation of the Computer to which the Present Disclosure is Applied)

The series of processing described above may be executed either by hardware or by software. In the case where a software-based series of processing is to be carried out, the programs constituting the software are installed into a suitable computer for execution. Such computers may include those with the software incorporated in their dedicated hardware beforehand, and those such as a general-purpose personal computer capable of executing diverse functions based on various programs installed therein.

Figure 22:
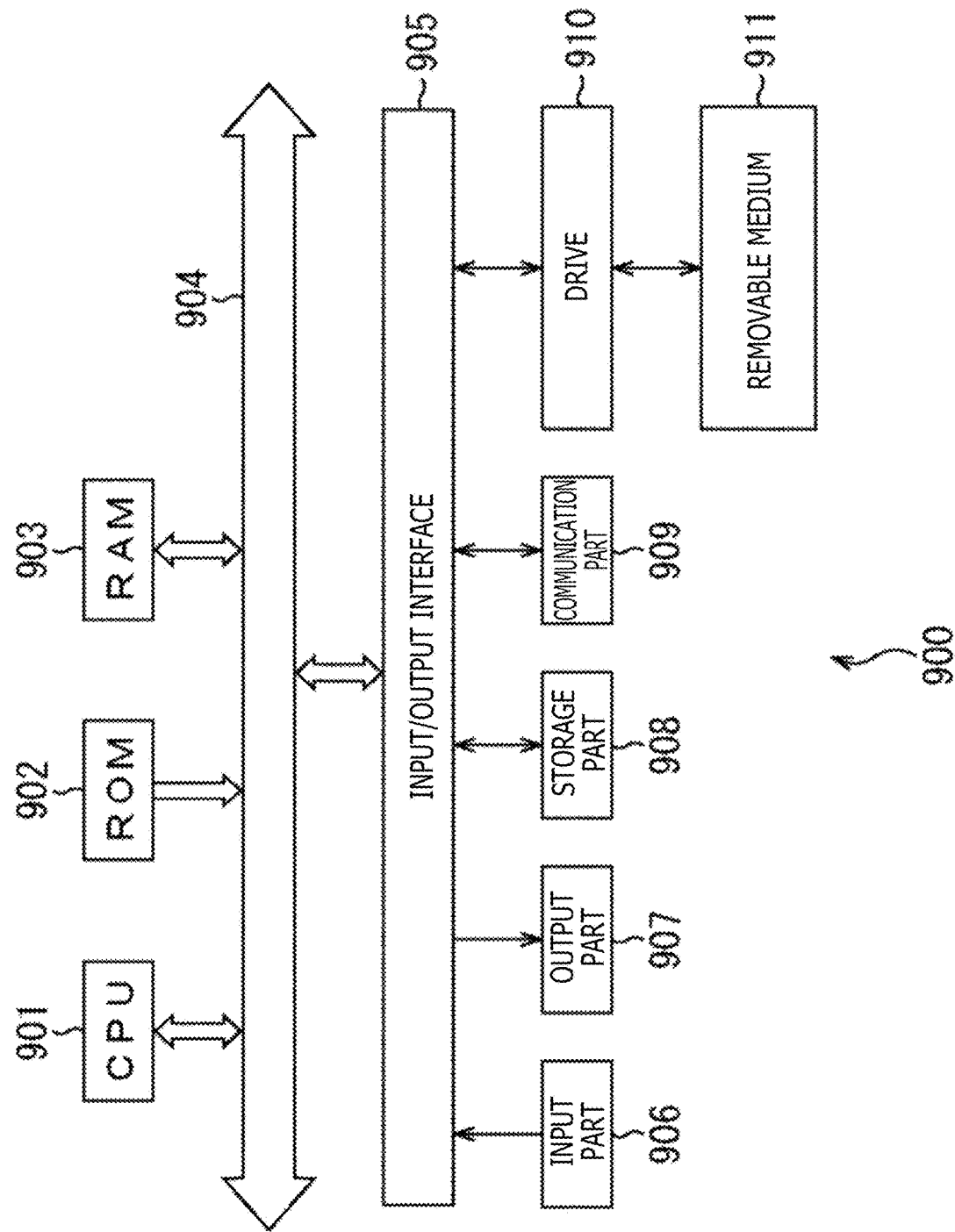
FIG. 22 is a block diagram depicting a typical hardware configuration of a computer.

FIG. 22 is a block diagram depicting a typical hardware configuration of a computer that executes the above-described series of processing using programs.

In a computer 900, a central processing unit (CPU) 901, a read-only memory (ROM) 902, and a random access memory (RAM) 903 are interconnected via a bus 904.

The bus 904 is further connected with an input/output interface 905. The input/output interface 905 is connected with an input part 906, an output part 907, a storage part 908, a communication part 909, and a drive 910.

The input part 906 includes a keyboard, a mouse, and a microphone, for example. The output part 907 includes a display unit and speakers, for example. The storage part 908 is typically formed by a hard disk or a nonvolatile memory. The communication part 909 is typically constituted by a network interface. The drive 910 drives removable media 911 such as a magnetic disk, an optical disk, a magneto-optical disk, or a semiconductor memory.

In the computer 900 configured as described above, the CPU 901 performs the above-mentioned series of processing by loading appropriate programs, for example, from the storage part 908 into the RAM 903 via the input/output interface 905 and the bus 904 and by executing the loaded programs.

The programs to be executed by the computer 900 (CPU 901) may be recorded on the removable media 911 such as packaged media when offered. The programs may also be offered via wired or wireless transmission media such as local area networks, the Internet, and digital satellite broadcasting.

In the computer 900, the programs may be installed into the storage part 908 from the removable media 911 attached to the drive 910 via the input/output interface 905. The programs may also be installed into the storage part 908 after being received by the communication part 909 via wired or wireless transmission media. The programs may alternatively be preinstalled in the ROM 902 or in the storage part 908.

Also, each program to be executed by the computer may be processed chronologically in the sequence depicted in this description; in parallel with other programs, or in otherwise appropriately timed fashion such as when it is invoked as needed.

APPLICATION EXAMPLES

The technology of the present disclosure may be applied to diverse products. For example, the technology may be implemented as an apparatus to be mounted on such mobile objects as automobiles, electric vehicles, hybrid electric vehicles, motorcycles, bicycles, personal mobility devices, aircraft, drones, ships, robots, construction equipment, and agricultural machinery (tractors).

FIG. 23 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 23, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 23 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 24 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 24 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 23, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE), LTE-advanced (LTE-A), or the like, or another wireless communication protocol such as wireless LAN (referred to also as wireless fidelity (Wi-Fi)), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal hand bone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MLH), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 23, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 23 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, the computer programs for implementing the functions of the delivery system 10 embodying the present technology and explained above with reference to FIGS. 1 to 21 may be installed in any one of the above-described control units. The recording media on which the computer programs are recorded may also be offered. The recording media may be magnetic disks, optical disks, magneto-optical disks, or flash memories, for example. The above-mentioned computer programs may alternatively be delivered without recourse to recording media, such as via networks.

In the case where the delivery system 10 embodying the present technology and explained above with reference to FIGS. 1 to 21 is used in the above-described vehicle control system 7000, the imaging apparatus 11 of the delivery system 10, for example, corresponds at least partially to the imaging part 7410. The generation apparatus 12, delivery server 13, and reproduction apparatus 15 are integrally configured and correspond to the microcomputer 7610 and storage part 7690. The head-mounted display 16 corresponds to the display part 7720. In the case where the delivery system 10 is used in the integrated control unit 7600, the network 14, camera 15A, marker 16A, and gyro sensor 16B are not provided. The viewer's visual line direction and viewing position are input by a passenger as the viewer operating the input part 7800. In a case where the delivery system 10 is used as described above in the integrated control unit 7600 depicted as an application example in FIG. 23, the display image generated by use of the omnidirectional image is made approximately uniform in image quality in all visual line directions.

At least some of the components of the delivery system 10 explained above with reference to FIGS. 1 to 21 may be implemented by a module (e.g., an integrated circuit module constituted by a single die) for the integrated control unit 7600 depicted in FIG. 23. Alternatively, the delivery system 10 discussed above with reference to FIGS. 1 to 21 may be implemented by multiple control units in the vehicle control system 7000 illustrated in FIG. 23.

In this description, the term "system" refers to an aggregate of multiple components (e.g., apparatuses or modules (parts)). It does not matter whether all components are housed in the same enclosure. Thus a system may be configured with multiple apparatuses housed in separate enclosures and interconnected via a network, or with a single apparatus that houses multiple modules in a single enclosure.

It is to be noted that the advantageous effects stated in this description are only examples and are not limitative of the present technology. There may be other advantageous effects derived from and not covered by this description.

The embodiments of the present disclosure are not limited to those discussed above. The embodiments may be modified, altered, or improved in diverse fashion within the scope and spirit of the present disclosure.

For example, the present disclosure may be implemented as a cloud computing setup in which a single function is processed cooperatively by multiple networked apparatuses on a shared basis.

Also, each of the steps discussed in reference to the above-described flowcharts may be executed either by a single apparatus or by multiple apparatuses on a shared basis.

Furthermore, if a single step includes multiple processes, these processes may be executed either by a single apparatus or by multiple apparatuses on a shared basis.

The present disclosure, when implemented, may be configured preferably as follows:

(1)

A generation apparatus including:

a down-conversion part configured to down-convert an omnidirectional image; and a projection part configured to generate multiple images by projecting on multiple two-dimensional planes the omnidirectional image mapped onto a 3D model.

(2)

The generation apparatus as stated in paragraph (1) above, further including:

a low-resolution encoding part configured to generate a low-resolution stream by encoding the omnidirectional image down-converted by the down-conversion part;

a high-resolution encoding part configured to generate high-resolution streams by encoding each of the multiple images generated by the projection part; and a transmission part configured to transmit the low-resolution stream generated by the low-resolution encoding part and the high-resolution streams generated by the high-resolution encoding part.

(3)

The generation apparatus as stated in paragraph (2) above, in which the transmission part transmits two-dimensional plane information indicative of the positions of the multiple two-dimensional planes.

(4)

The generation apparatus as stated in any one of paragraphs (1) to (3) above, in which the images on adjacent two of the two-dimensional planes partially overlap with each other.

(5)

The generation apparatus as stated in any one of paragraphs (1) to (4) above, in which a normal line passing through the center of each of the multiple two-dimensional planes is a line that passes through the midpoint of each of the sides of a cube and through the center of the cube.

(6)

The generation apparatus as stated in any one of paragraphs (1) to (4) above, in which a normal line passing through the center of each of the multiple two-dimensional planes is a line that passes through the midpoint of each of the sides of a cube and through the center of the cube, and a line that passes through the renter of each of the faces of the cube and through the center of the cube.

(7)

The generation apparatus as stated in any one of paragraphs (1) to (6) above, in which the omnidirectional image is constituted by an omnidirectional image from a left-eye viewpoint and an omnidirectional image from a right-eye viewpoint, the down-conversion part generates a low-resolution packed image by packing the down-converted omnidirectional images from the left-eye and right-eye viewpoints, and the projection part generates a high-resolution packed image by packing, on each of the multiple two-dimensional planes, the multiple images from the left-eye and right-eye viewpoints generated by projecting on the multiple two-dimensional planes each of the omnidirectional images from the left-eye and right-eye viewpoints mapped onto the 3D model.

(8)

A generation method including the steps of:

causing a generation apparatus to down-convert an omnidirectional image; and causing the generation apparatus to generate multiple images by projecting on multiple two-dimensional planes the omnidirectional image mapped onto a 3D model.

(9)

A reproduction apparatus including:

an acceptance part configured to accept at least one of multiple images generated by projecting on multiple two-dimensional planes an omnidirectional image mapped onto a 3D model, and the omnidirectional image having been down-converted; and a rendering part configured to generate a display image on the basis of at least either the image accepted by the acceptance part or the down-converted omnidirectional image.

(10)

The reproduction apparatus as stated in paragraph (9) above, further including:

a selection part configured to select, from the multiple images, the image accepted by the acceptance part on the basis of the visual line direction of a viewer.

(11)

The reproduction apparatus as stated in paragraph (10) above, in which the acceptance part accepts two-dimensional plane information indicative of the positions of the multiple two-dimensional planes, and the selection part selects the image on the basis of the two-dimensional plane information and the visual line direction.

(12)

The reproduction apparatus as stated in paragraph (9) above, further including:

a mapping processing part configured to generate a 3D model image by mapping the image onto the two-dimensional planes and by mapping the down-converted omnidirectional image onto the 3D model;

in which the rendering part generates the display image by projecting on the visual field range of a viewer the 3D model image generated by the mapping processing part.

(13)

The reproduction apparatus as stated in any one of paragraphs (9) to (12) above, further including:

a low-resolution decoding part configured to decode a low-resolution stream generated by encoding the down-converted omnidirectional image so as to generate the down-converted omnidirectional image; and a high-resolution decoding part configured to decode a high-resolution stream generated by encoding at least one of the multiple images so as to generate the image;

in which the acceptance part accepts the low-resolution stream and the high-resolution stream.

(14)

The reproduction apparatus as stated in any one of paragraphs (9) to (13) above, in which the images on adjacent two of the two-dimensional planes partially overlap with each other.

(15)

The reproduction apparatus as stated in any one of paragraphs (9) to (14) above, in which a normal line passing through the center of each of the multiple two-dimensional is a line that planes passes through the midpoint of each of the sides of a cube and through the center of the cube.

(16)

The reproduction apparatus as stated in any one of paragraphs (9) to (14) above, in which a normal line passing through the center of each of the multiple two-dimensional planes is a line that passes through the midpoint of each of the sides of a cube and through the center of the cube, and a line that passes through the center of each of the faces of the cube and through the center of the cube.

(17)

The reproduction apparatus as stated in any one of paragraphs (9) to (11) above, in which the down-converted omnidirectional image is a packed image in which the down-converted omnidirectional image from a left-eye viewpoint and the down-converted omnidirectional image from a right-eye viewpoint are packed, and the multiple images are packed images generated by projecting on each of the two-dimensional planes each of the omnidirectional images from the left-eye and right-eye viewpoints mapped onto the 3D model.

(18)

The reproduction apparatus as stated in paragraph (17) above, in which the rendering part divides by viewpoint the image accepted by the acceptance part and the down-converted omnidirectional image, the rendering part further generating the display image on the basis of at least either the image or the down-converted omnidirectional image having been divided by viewpoint.

(19)

A reproduction method including the steps of:

causing a reproduction apparatus to accept at least one of multiple images generated by projecting on multiple two-dimensional planes an omnidirectional image mapped onto a 3D model, and the omnidirectional image having been down-converted; and causing the reproduction apparatus to generate a display image on the basis of at least either the image accepted in the accepting step or the down-converted omnidirectional image.

REFERENCE SIGNS LIST

12 Generation apparatus
23 Down-conversion part
24 Encoder
26-1 to 26-5 Perspective projection part
27-1 to 27-5 Encoder
29 Transmission part
40 Sphere
41 to 45 Two-dimensional plane
121 Reception part
122 Decoder
123 Reception part
124 Decoder
125 Mapping processing part
126 Rendering part
128 Visual line detecting part
143 Two-dimensional plane
151 Low-resolution image
152 High-resolution image
170 Display image
171 High-resolution image
172 Low-resolution image
180 Display image
181 High-resolution image
182 Low-resolution image
190 Display image
191 High-resolution image
192 Low-resolution image

The invention claimed is:

1. A generation apparatus comprising:
a down-conversion part configured to down-convert an omnidirectional image;
a projection part configured to generate a plurality of images by projecting on a plurality of two-dimensional planes the omnidirectional image mapped onto a 3D model;
a low-resolution encoding part configured to generate a low-resolution stream by encoding the omnidirectional image down-converted by the down-conversion part;
a high-resolution encoding part configured to generate high-resolution streams by encoding each of the plurality of images generated by the projection part; and
a transmission part configured to transmit the low-resolution stream generated by the low-resolution encoding part and the high-resolution streams generated by the high-resolution encoding part,
wherein images on adjacent two of the two-dimensional planes partially overlap with each other.

2. The generation apparatus according to claim 1, wherein the transmission part transmits two-dimensional plane information indicative of the positions of the plurality of two-dimensional planes.

3. The generation apparatus according to claim 1, wherein a normal line passing through the center of each of the plurality of two-dimensional planes is a line that passes through the midpoint of each of the sides of a cube and through the center of the cube, and a line that passes through the center of each of the faces of the cube and through the center of the cube.

4. A generation apparatus comprising:
a down-conversion part configured to down-convert an omnidirectional image; and
a projection part configured to generate a plurality of images by projecting on a plurality of two-dimensional planes the omnidirectional image mapped onto a 3D model,
wherein a normal line passing through the center of each of the plurality of two-dimensional planes is a line that passes through the midpoint of each of the sides of a cube and through the center of the cube.

5. A generation apparatus comprising:
a down-conversion part configured to down-convert an omnidirectional image; and
a projection part configured to generate a plurality of images by projecting on a plurality of two-dimensional planes the omnidirectional image mapped onto a 3D model, wherein
the omnidirectional image is constituted by an omnidirectional image from a left-eye viewpoint and an omnidirectional image from a right-eye viewpoint,
the down-conversion part generates a low-resolution packed image by packing the down-converted omnidirectional images from the left-eye and right-eye viewpoints, and
the projection part generates a high-resolution packed image by packing, on each of the plurality of two-dimensional planes, the plurality of images from the left-eye and right-eye viewpoints generated by projecting on the plurality of two-dimensional planes each of the omnidirectional images from the left-eye and right-eye viewpoints mapped onto the 3D model.

6. A generation method comprising:
causing a generation apparatus to down-convert an omnidirectional image;
causing the generation apparatus to generate a plurality of images by projecting on a plurality of two-dimensional planes the omnidirectional image mapped onto a 3D model;
causing the generation apparatus to generate a low-resolution stream by encoding the down-converted omnidirectional image;
causing the generation apparatus to generate high-resolution streams by encoding each of the generated plurality of images; and
causing the generation apparatus to transmit the generated low-resolution stream and the generated high-resolution streams,
wherein images on adjacent two of the two-dimensional planes partially overlap with each other.

7. A reproduction apparatus comprising:
an acceptance part configured to accept at least one of a plurality of images generated by projecting on a plurality of two-dimensional planes an omnidirectional image mapped onto a 3D model, and the omnidirectional image having been down-converted;
a rendering part configured to generate a display image on a basis of at least either the image accepted by the acceptance part or the down-converted omnidirectional image;
a low-resolution decoding part configured to decode a low-resolution stream generated by encoding the down-converted omnidirectional image so as to generate the down-converted omnidirectional image; and
a high-resolution decoding part configured to decode a high-resolution stream generated by encoding at least one of the plurality of images so as to generate the image,
wherein the acceptance part accepts the low-resolution stream and the high-resolution stream, and
wherein images on adjacent two of the two-dimensional planes partially overlap with each other.

8. The reproduction apparatus according to claim 7, further comprising:
a selection part configured to select, from the plurality of images, the image accepted by the acceptance part on a basis of the visual line direction of a viewer.

9. The reproduction apparatus according to claim 8, wherein the acceptance part accepts two-dimensional plane information indicative of the positions of the plurality of two-dimensional planes, and
the selection part selects the image on a basis of the two-dimensional plane information and the visual line direction.

10. The reproduction apparatus according to claim 7, further comprising:
a mapping processing part configured to generate a 3D model image by mapping the image onto the two-dimensional planes and by mapping the down-converted omnidirectional image onto the 3D model;
wherein the rendering part generates the display image by projecting on the visual field range of a viewer the 3D model image generated by the mapping processing part.

11. The reproduction apparatus according to claim 7, wherein a normal line passing through the center of each of the plurality of two-dimensional planes is a line that passes through the midpoint of each of the sides of a cube and through the center of the cube, and a line that passes through the center of each of the faces of the cube and through the center of the cube.

12. A reproduction apparatus comprising:
an acceptance part configured to accept at least one of a plurality of images generated by projecting on a plurality of two-dimensional planes an omnidirectional image mapped onto a 3D model, and the omnidirectional image having been down-converted; and
a rendering part configured to generate a display image on a basis of at least either the image accepted by the acceptance part or the down-converted omnidirectional image,
wherein a normal line passing through the center of each of the plurality of two-dimensional planes is a line that planes passes through the midpoint of each of the sides of a cube and through the center of the cube.

13. A reproduction apparatus comprising:
an acceptance part configured to accept at least one of a plurality of images generated by projecting on a plurality of two-dimensional planes an omnidirectional image mapped onto a 3D model, and the omnidirectional image having been down-converted; and
a rendering part configured to generate a display image on a basis of at least either the image accepted by the acceptance part or the down-converted omnidirectional image, wherein
the down-converted omnidirectional image is a packed image in which the down-converted omnidirectional image from a left-eye viewpoint and the down-converted omnidirectional image from a right-eye viewpoint are packed, and the plurality of images are packed images generated by projecting on each of the two-dimensional planes each of the omnidirectional images from the left-eye and right-eye viewpoints mapped onto the 3D model.

14. The reproduction apparatus according to claim 13, wherein the rendering part divides by viewpoint the image accepted by the acceptance part and the down-converted omnidirectional image, the rendering part further generating the display image on a basis of at least either the image or the down-converted omnidirectional image having been divided by viewpoint.

15. A reproduction method comprising:
causing a reproduction apparatus to accept at least one of a plurality of images generated by projecting on a plurality of two-dimensional planes an omnidirectional image mapped onto a 3D model, and the omnidirectional image having been down-converted;
causing the reproduction apparatus to generate a display image on a basis of at least either the accepted at least one of the plurality of images or the down-converted omnidirectional image;
causing the reproduction apparatus to decode a low-resolution stream generated by encoding the down-converted omnidirectional image so as to generate the down-converted omnidirectional image; and
causing the reproduction apparatus to decode a high-resolution stream generated by encoding at least one of the plurality of images so as to generate the image,
wherein the reproduction apparatus is further caused to accept the low-resolution stream and the high-resolution stream, and
wherein images on adjacent two of the two-dimensional planes partially overlap with each other.

* * * * *